(12) United States Patent
Matsui et al.

(10) Patent No.: US 7,568,221 B2
(45) Date of Patent: Jul. 28, 2009

(54) INFORMATION PROCESSING SYSTEM, INFORMATION PROCESSING APPARATUS AND METHOD

(75) Inventors: Yuji Matsui, Tokyo (JP); Kimio Maki, Tokyo (JP); Shuji Okegawa, Chiba (JP); Masayuki Kuwata, Tokyo (JP)

(73) Assignee: Sony Corporation, Tokyo (JP)

( * ) Notice: Subject to any disclaimer, the term of this patent is extended or adjusted under 35 U.S.C. 154(b) by 432 days.

(21) Appl. No.: 10/381,545

(22) PCT Filed: Jul. 26, 2002

(86) PCT No.: PCT/JP02/07580

§ 371 (c)(1),
(2), (4) Date: Oct. 20, 2003

(87) PCT Pub. No.: WO03/010675

PCT Pub. Date: Feb. 6, 2003

(65) Prior Publication Data

US 2004/0064452 A1    Apr. 1, 2004

(30) Foreign Application Priority Data

Jul. 27, 2001  (JP) ............................. 2001-227127
Sep. 10, 2001  (JP) ............................. 2001-273420

(51) Int. Cl.
*H04L 9/32* (2006.01)
(52) U.S. Cl. ...................................................... 726/8
(58) Field of Classification Search ...................... 726/8
See application file for complete search history.

(56) References Cited

U.S. PATENT DOCUMENTS 5,671,354 A * 9/1997 Ito et al. ........................ 726/3
5,684,950 A * 11/1997 Dare et al. ................... 726/10
5,710,591 A * 1/1998 Bruno et al. ............. 348/14.09
5,818,936 A * 10/1998 Mashayekhi ................ 713/167

(Continued)

FOREIGN PATENT DOCUMENTS

JP            8 221364           8/1996

(Continued)

OTHER PUBLICATIONS

Internet Design and Development, copyright year 2000, http://www.myemaillists.com/faq.html, retrieved date: Nov. 30, 2008. (4 sheets).*

*Primary Examiner*—Benjamin E Lanier
*Assistant Examiner*—Samson B Lemma
(74) *Attorney, Agent, or Firm*—Frommer Lawrence & Haug LLP; William S. Frommer; Thomas F. Presson

(57) ABSTRACT

The present invention relates to an information processing systems, an information processing apparatus, and method. A camcorder establishes a connection to a network system through a Bluetooth adapter and a public network, performs user registration into the network system and receives provision of an ID and a password from the network system. The ID and the password are transmitted to and registered into a customer database of an Internet service provider, and also transmitted to and registered into a camcorder image station of a network service business center. After the camcorder connects to the network system, the Internet service provider, and the network service business center, the common ID and password can be used.

21 Claims, 17 Drawing Sheets

U.S. PATENT DOCUMENTS

| | | | |
|---|---|---|---|
| 6,587,880 B1 * | 7/2003 | Saigo et al. | 709/225 |
| 6,670,933 B1 * | 12/2003 | Yamazaki | 345/1.1 |
| 6,996,718 B1 * | 2/2006 | Henry et al. | 713/182 |
| 7,260,597 B1 * | 8/2007 | Hofrichter et al. | 709/200 |

FOREIGN PATENT DOCUMENTS

| | | |
|---|---|---|
| JP | 8 255133 | 10/1996 |
| JP | 11-25051 | 1/1999 |
| JP | 11 164282 | 6/1999 |
| JP | 2000-259566 | 9/2000 |
| JP | 2001-56796 | 2/2001 |
| JP | 2001-92555 | 4/2001 |
| JP | 2001 306915 | 11/2001 |
| JP | 2002 108680 | 4/2002 |
| JP | 2002-163234 | 6/2002 |
| JP | 2002-215586 | 8/2002 |
| WO | WO 99 56434 | 11/1999 |

* cited by examiner

FIG. 12

```
PPP LOGIN:
   □□□@△△△
PPP PASSWORD:
   ○×△□#&★φ
ACCESS POINT TELEPHONE NUMBER:
   **-$$$$-¥¥¥¥
POP ID:
   □□□
POP PASSWORD:
   ○×△□#&★φ
E-MAIL ADDRESS:
   □□□@△△△△.xxxx.ne.jp
POP SERVER:
   pop.△△△△.xxxx.ne.jp
SMTP MAIL SERVER:
   mail.△△△△.xxxx.ne.jp
NEWS SERVER:
   news01.xxxxx.ne.jp
```

FIG. 13

```
DI CUSTOMER ID:
   **000000
DI PASSWORD:
   #####
ACCESS POINT TELEPHONE NUMBER
   **-$$$$-¥¥¥¥
```

F I G. 1 4 A

| ORDINARY ISP SETTING ITEMS |
|---|
| · ID FOR PPP CONNECTION<br>· PASSWORD FOR PPP CONNECTION<br>· ACCESS POINT TELEPHONE NUMBER<br>· PRIMARY DNS SERVER<br>· SECONDARY DNS SERVER<br>· PROXY SERVER<br>· PORT NUMBER<br>· ID FOR POP AUTHENTICATION<br>· PASSWORD FOR POP AUTHENTICATION<br>· POP SERVER<br>· SMTP SERVER<br>· MAIL ADDRESS |

F I G. 1 4 B

| SIMPLE CONNECTION SETTING ITEMS |
|---|
| · UNIFIED ID<br>· PASSWORD<br>· ACCESS POINT TELEPHONE NUMBER |

F I G. 1 5
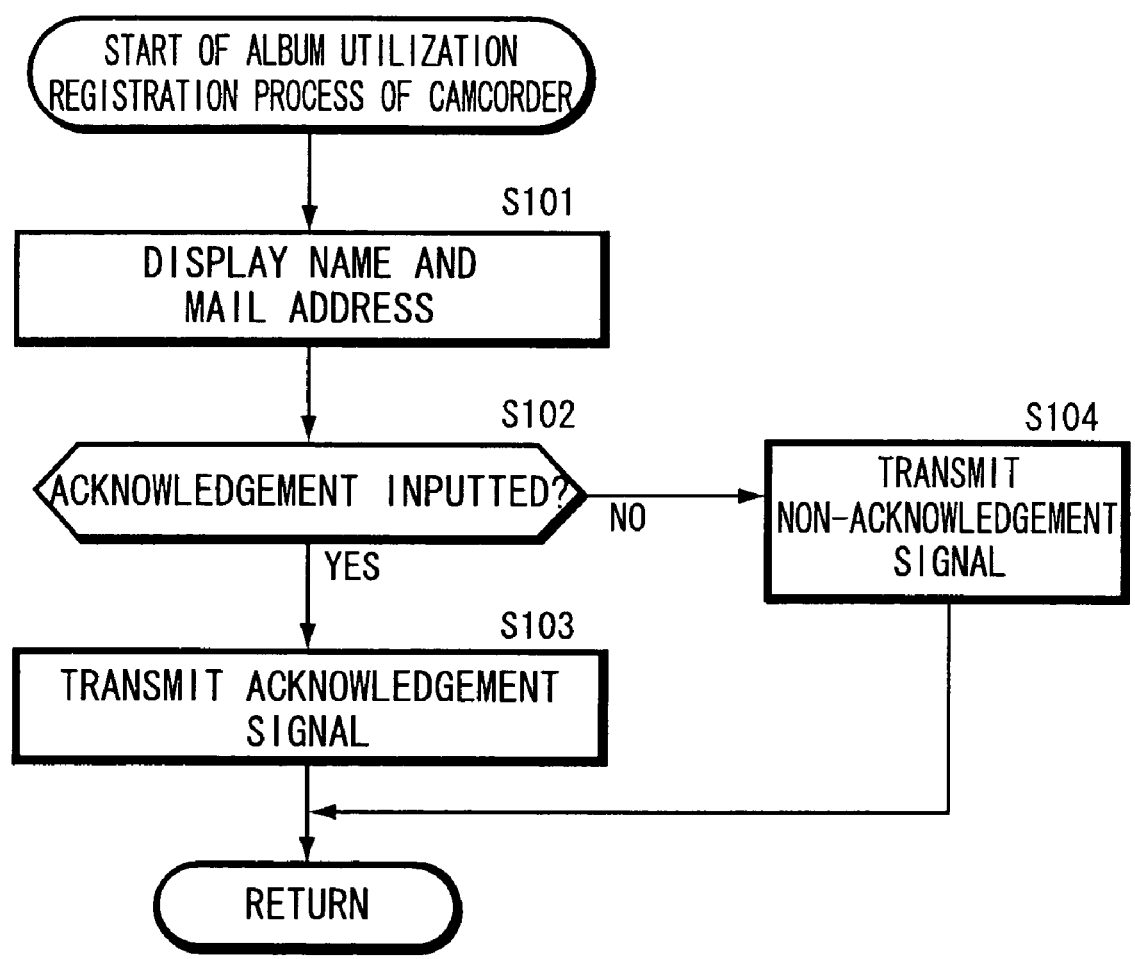

id="page-header" # INFORMATION PROCESSING SYSTEM, INFORMATION PROCESSING APPARATUS AND METHOD

TECHNICAL FIELD

The present invention relates to an information processing system, an information processing apparatus and method, and more particularly to an information processing system, an information processing apparatus and method by which a common ID can be used to access a plurality of servers through a network.

BACKGROUND ART

FIG. 1 shows an example of a configuration of a conventional service providing system. In this service providing system, a personal computer 1 is connected to a server 2-1 or 2-2 or an Internet service provider (ISP) 2-3. In order to connect the personal computer 1 to the server 2-1, the server 2-1 utilizes a customer ID 1 and a customer password 1 set upon user registration in the server 2-1. Similarly, in order to access the server 2-2, a customer ID 2 and a customer password 2 set upon user registration in the server 2-2 are used. Further, in order to access the server 2-2, a customer nickname is also used.

Further, in order to access the Internet service provider 2-3, a dial-up ID and a dial-up password issued upon user registration in the Internet service provider 2-3 and a POP (Post Office Protocol) ID and a POP password are used.

In this manner, when the user of the personal computer 1 tries to access the server 2-1 or 2-2 or the Internet service provider 2-3 and connect further to the Internet from there, it suitably and selectively uses the customer IDs, customer passwords, customer nicknames, dial-up IDs, dial-up passwords, POP IDs, POP passwords and so forth set individually upon user registration.

In the conventional service providing system, since different IDs and passwords must be selectively used for individual access destinations in this manner, the user must take notes of the IDs and passwords of the individual access destinations, and this is inconvenient to the user. Further, even if the ID and the password of an access destination which is accessed frequently can be memorized, the user is likely to forget the ID and the password of another access destination which is accessed but seldom, and therefore, in order to access the access destination, the user must search for the notes and confirm the ID and the password. Thus, there is a subject that rapid accessing is difficult.

DISCLOSURE OF INVENTION

The present invention has been made in view of such a situation as described above and allows common use of an ID and a password for a plurality of common accessing destinations thereby to improve the operability.

A first information processing system of the present invention is characterized in that first access information necessitated when a first one of information processing apparatus accesses a second one of the information processing apparatus and second access information necessitated when the first information processing apparatus accesses a third one of said the information processing apparatus, where said first access information and said second access information have a common indentification.

The access information may include an ID and a password.

The second information processing apparatus may issue the access information when a user of the first information processing apparatus is registered into the second information processing apparatus, and the third information processing apparatus may issue the access information when the user is registered into the third information processing apparatus in order to provide a predetermined service to the user of the first information processing apparatus.

The access information may be used further as third access information necessitated when a fourth one of the information processing apparatus provides a predetermined service to the user of the first information processing apparatus.

A first information processing apparatus of the present invention is characterized in that it includes acceptance means for accepting personal information of a user of a first different information processing apparatus, storage means for storing the personal information accepted by the acceptance means, issuance means for issuing an ID corresponding to the personal information accepted by the acceptance means, and transmission means for transmitting the ID issued by the issuance means to a second different information processing apparatus through a network.

A first information processing method of the present invention is characterized in that it includes an acceptance step of accepting personal information of a user of a first information processing apparatus, a storage step of storing the personal information accepted by the process of the acceptance step, an issuance step of issuing an ID corresponding to the personal information accepted by the process of the acceptance step, and a transmission step of transmitting the ID issued by the process of the issuance step to a second information processing apparatus through a network.

A first recording medium of the present invention is characterized in that a program includes an acceptance step of accepting personal information of a user of a first information processing apparatus, a storage step of storing the personal information accepted by the process of the acceptance step, an issuance step of issuing an ID corresponding to the personal information accepted by the process of the acceptance step, and a transmission step of transmitting the ID issued by the process of the issuance step to a second information processing apparatus through a network.

A first program of the present invention causes a computer to execute an acceptance step of accepting personal information of a user of a first information processing apparatus, a storage step of storing the personal information accepted by the process of the acceptance step, an issuance step of issuing an ID corresponding to the personal information accepted by the process of the acceptance step, and a transmission step of transmitting the ID issued by the process of the issuance step to a second information processing apparatus through a network.

A second information processing apparatus is characterized in that it includes reception means for receiving, from a second different information processing apparatus in which personal information of a user of a first different information processing apparatus is registered, the personal information through a network, control means for controlling the first different information processing apparatus to display at least part of the personal information received by the reception means for registration of the user of the first different information processing apparatus, confirmation means for acquiring confirmation of the user with regard to registration of the user based on at least part of the personal information displayed on the first different information processing apparatus, registration means for registering the user based on the personal information received by the reception means in response to the confirmation by the confirmation means, issuance means for issuing an ID to the user, and production means for producing a table wherein the ID issued by the issuance means is matched with an ID and a password issued by the second different information processing apparatus and included in the personal information received by the reception means.

The information processing apparatus may further include requesting means for requesting, where an ID is issued already to the user of the first different information processing apparatus, the first information processing apparatus to match the ID issued already and the ID by the second information processing apparatus with each other.

A second information processing method of the present invention is characterized in that it includes a reception step of receiving, from a second information processing apparatus in which personal information of a user of a first information processing apparatus is registered, the personal information through a network, a control step of controlling the first information processing apparatus to display at least part of the personal information received by the process of the reception step for registration of the user of the first information processing apparatus, a confirmation step of acquiring confirmation of the user with regard to registration of the user based on at least part of the personal information displayed on the first information processing apparatus, a registration step of registering the user based on the personal information received by the process of the reception step in response to the confirmation by the process of the confirmation step, an issuance step of issuing an ID to the user, and a production step of producing a table wherein the ID issued by the process of the issuance step is matched with an ID and a password issued by the second information processing apparatus and included in the personal information received by the process of the reception step.

A second recording medium of the present invention is characterized in that a program includes a reception step of receiving, from a second information processing apparatus in which personal information of a user of a first information processing apparatus is registered, the personal information through a network, a control step of controlling the first information processing apparatus to display at least part of the personal information received by the process of the reception step for registration of the user of the first information processing apparatus, a confirmation step of acquiring confirmation of the user with regard to registration of the user based on at least part of the personal information displayed on the first information processing apparatus, a registration step of registering the user based on the personal information received by the process of the reception step in response to the confirmation by the process of the confirmation step, an issuance step of issuing an ID to the user, and a production step of producing a table wherein the ID issued by the process of the issuance step is matched with an ID and a password issued by the second information processing apparatus and included in the personal information received by the process of the reception step.

A second program of the present invention causes a computer to execute a reception step of receiving, from a second information processing apparatus in which personal information of a user of a first information processing apparatus is registered, the personal information through a network, a control step of controlling the first information processing apparatus to display at least part of the personal information received by the process of the reception step for registration of the user of the first information processing apparatus, a confirmation step of acquiring confirmation of the user with regard to registration of the user based on at least part of the personal information displayed on the first information processing apparatus, a registration step of registering the user based on the personal information received by the process of the reception step in response to the confirmation by the process of the confirmation step, an issuance step of issuing an ID to the user, and a production step of producing a table wherein the ID issued by the process of the issuance step is matched with an ID and a password issued by the second information processing apparatus and included in the personal information received by the process of the reception step.

A third information processing apparatus of the present invention is characterized in that it includes reception means for receiving, from a second different information processing apparatus in which personal information of a user of a first different information processing apparatus is registered, a mail address and a name as well as an ID and a password of the user through a network, control means for controlling the first different information processing apparatus to display the mail address and the name received by the reception means for registration of the user, confirmation means for acquiring confirmation of the user with regard to registration of the user based on the mail address and the name displayed on the first different information processing apparatus, and registration means for registering the mail address and the name as well as the ID and the password as information for acceptance of accessing from the user in response to the confirmation by the confirmation means.

A third information processing method of the present invention is characterized in that it includes a reception step of receiving, from a second information processing apparatus in which personal information of a user of a first information processing apparatus is registered, a mail address and a name as well as an ID and a password of the user through a network, a control step of controlling the first information processing apparatus to display the mail address and the name received by the process of the reception step for registration of the user, a confirmation step of acquiring confirmation of the user with regard to registration of the user based on the mail address and the name displayed on the first information processing apparatus, and a registration step of registering the mail address and the name as well as the ID and the password as information for acceptance of accessing from the user in response to the confirmation by the process of the confirmation step.

A third recording medium of the present invention is characterized in that a program includes a reception step of receiving, from a second information processing apparatus in which personal information of a user of a first information processing apparatus is registered, a mail address and a name as well as an ID and a password of the user through a network, a control step of controlling the first information processing apparatus to display the mail address and the name received by the process of the reception step for registration of the user, a confirmation step of acquiring confirmation of the user with regard to registration of the user based on the mail address and the name displayed on the first information processing apparatus, and a registration step of registering the mail address and the name as well as the ID and the password as information for acceptance of accessing from the user in response to the confirmation by the process of the confirmation step.

A third program of the present invention causes a computer to execute a reception step of receiving, from a second information processing apparatus in which personal information of a user of a first information processing apparatus is registered, a mail address and a name as well as an ID and a password of the user through a network, a control step of controlling the first information processing apparatus to display the mail address and the name received by the process of the reception step for registration of the user, a confirmation step of acquiring confirmation of the user with regard to registration of the user based on the mail address and the name displayed on the first information processing apparatus, and a registration step of registering the mail address and the name as well as the ID and the password as information for acceptance of accessing from the user in response to the confirmation by the process of the confirmation step.

A fourth information processing apparatus of the present invention is characterized in that it includes reception means for receiving an ID through a network from a first different information processing apparatus in which personal information of a user is registered, production means for producing a table wherein an ID issued already by a second different information processing apparatus is matched with the ID received by the reception means, first accessing means for accessing the first different information processing apparatus through the network based on the ID received from the first different information processing apparatus, and second accessing means for converting, in order to access the second different information processing apparatus through the network, the ID received from the first different information processing apparatus into the ID issued from the second different information processing apparatus based on the table produced by the production means and accessing the second different information processing apparatus with the ID obtained by the conversion.

A fourth information processing method of the present invention is characterized in that it includes a reception step of receiving an ID through a network from a first information processing apparatus in which personal information of a user is registered, a production step of producing a table wherein an ID issued already by a second information processing apparatus is matched with the ID received by the process of the reception step, a first accessing step of accessing the first information processing apparatus through the network based on the ID received from the first information processing apparatus, and a second accessing step of converting, in order to access the second information processing apparatus through the network, the ID received from the first information processing apparatus into the ID issued from the second information processing apparatus based on the table produced by the step of the production step and accessing the second different information processing apparatus with the ID obtained by the conversion.

A fourth recording medium of the present invention is characterized in that a program includes a reception step of receiving an ID through a network from a first information processing apparatus in which personal information of a user is registered, a production step of producing a table wherein an ID issued already by a second information processing apparatus is matched with the ID received by the process of the reception step, a first accessing step of accessing the first information processing apparatus through the network based on the ID received from the first information processing apparatus, and a second accessing step of converting, in order to access the second information processing apparatus through the network, the ID received from the first information processing apparatus into the ID issued from the second information processing apparatus based on the table produced by the step of the production step and accessing the second different information processing apparatus with the ID obtained by the conversion.

A fourth program of the present invention causes a computer to execute a reception step of receiving an ID through a network from a first information processing apparatus in which personal information of a user is registered, a production step of producing a table wherein an ID issued already by a second information processing apparatus is matched with the ID received by the process of the reception step, a first accessing step of accessing the first information processing apparatus through the network based on the ID received from the first information processing apparatus, and a second accessing step of converting, in order to access the second information processing apparatus through the network, the ID received from the first information processing apparatus into the ID issued from the second information processing apparatus based on the table produced by the step of the production step and accessing the second information processing apparatus with the ID obtained by the conversion.

In the information processing system of the present invention, the first access information necessitated to access the second information processing apparatus and the second access information necessitated to access the third information processing apparatus are common.

In the first information processing apparatus and method, recording medium and program of the present invention, an ID corresponding to accepted personal information is issued, and the ID is transmitted to the second different information processing apparatus through the network.

In the second information processing apparatus and method, recording medium and program of the present invention, at least part of the personal information received from the second different information processing apparatus is displayed on the first different information processing apparatus, registration of the user of the first information processing apparatus is confirmed by the user, and an ID same as that of the second different information processing apparatus is issued in response to the confirmation.

In the third information processing apparatus and method, recording medium and program of the present invention, a mail address and a name as well as an ID and a password of the user are received from the second different information processing apparatus through the network, and the mail address and the name are displayed for registration of the user of the first different information processing apparatus. Then, confirmation of the user with regard to registration of the user based on the mail address and the name is acquired, and the ID and the password are registered as information for accepting accessing from the user based on the confirmation.

In the fourth information processing apparatus and method, recording medium and program of the present invention, an ID received from the first different information processing apparatus is converted based on the table and is used to access the second information processing apparatus.

BRIEF DESCRIPTION OF DRAWINGS

FIG. 12 is a view illustrating an example of ISP-A setting information at step S79 of FIG. 11;

FIG. 13 is a view illustrating an example of camcorder setting information at step S80 of FIG. 11;

FIG. 14A is a view illustrating setting items upon connection to the Internet;

FIG. 14B is a view illustrating setting items upon connection to the Internet;

FIG. 15 is a flow chart illustrating an album utilization registration process of the camcorder of FIG. 2;

BEST MODE FOR CARRYING OUT THE INVENTION

Figure 1:
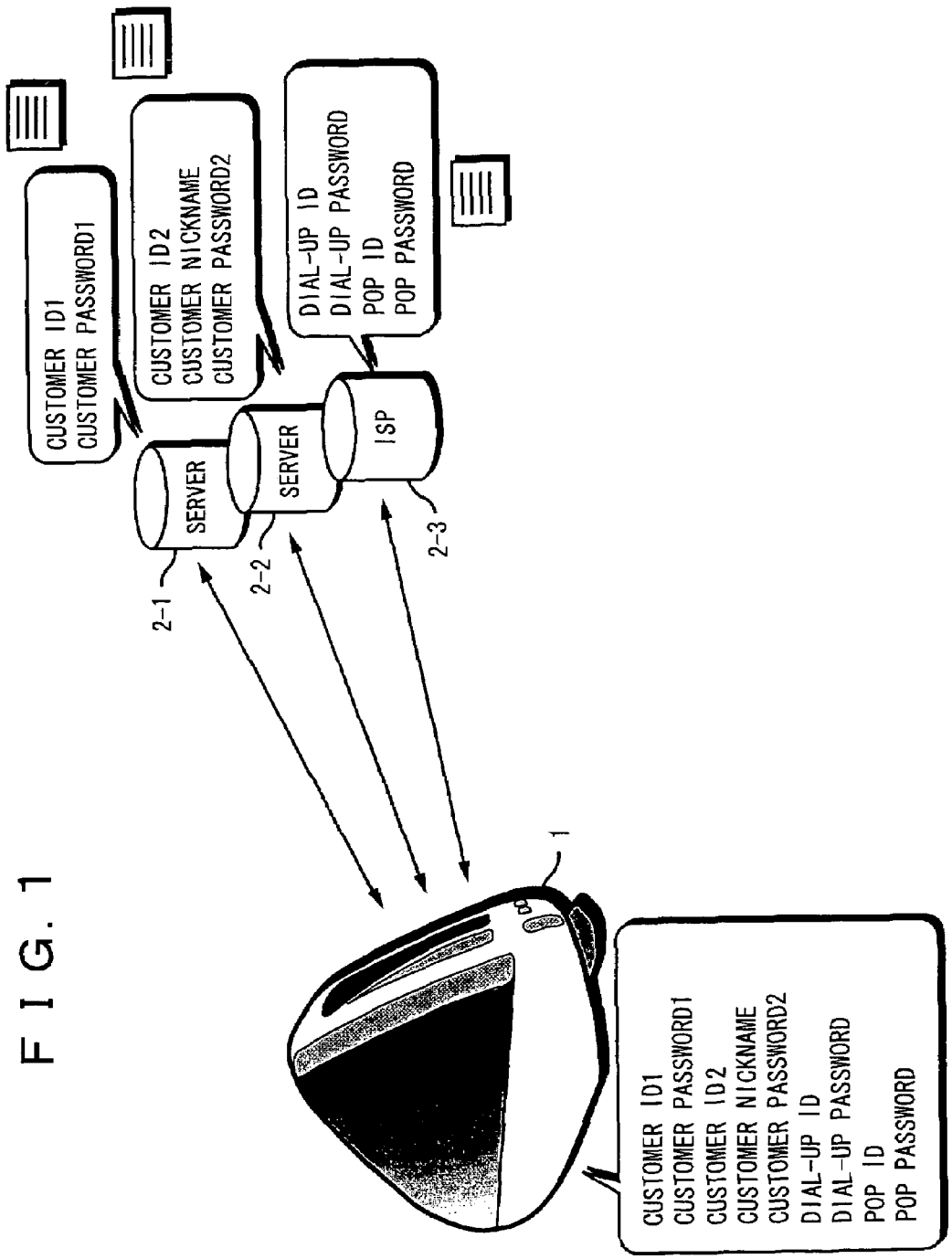
FIG. 1 is a view showing a configuration of a conventional service providing system.
Figure 2:
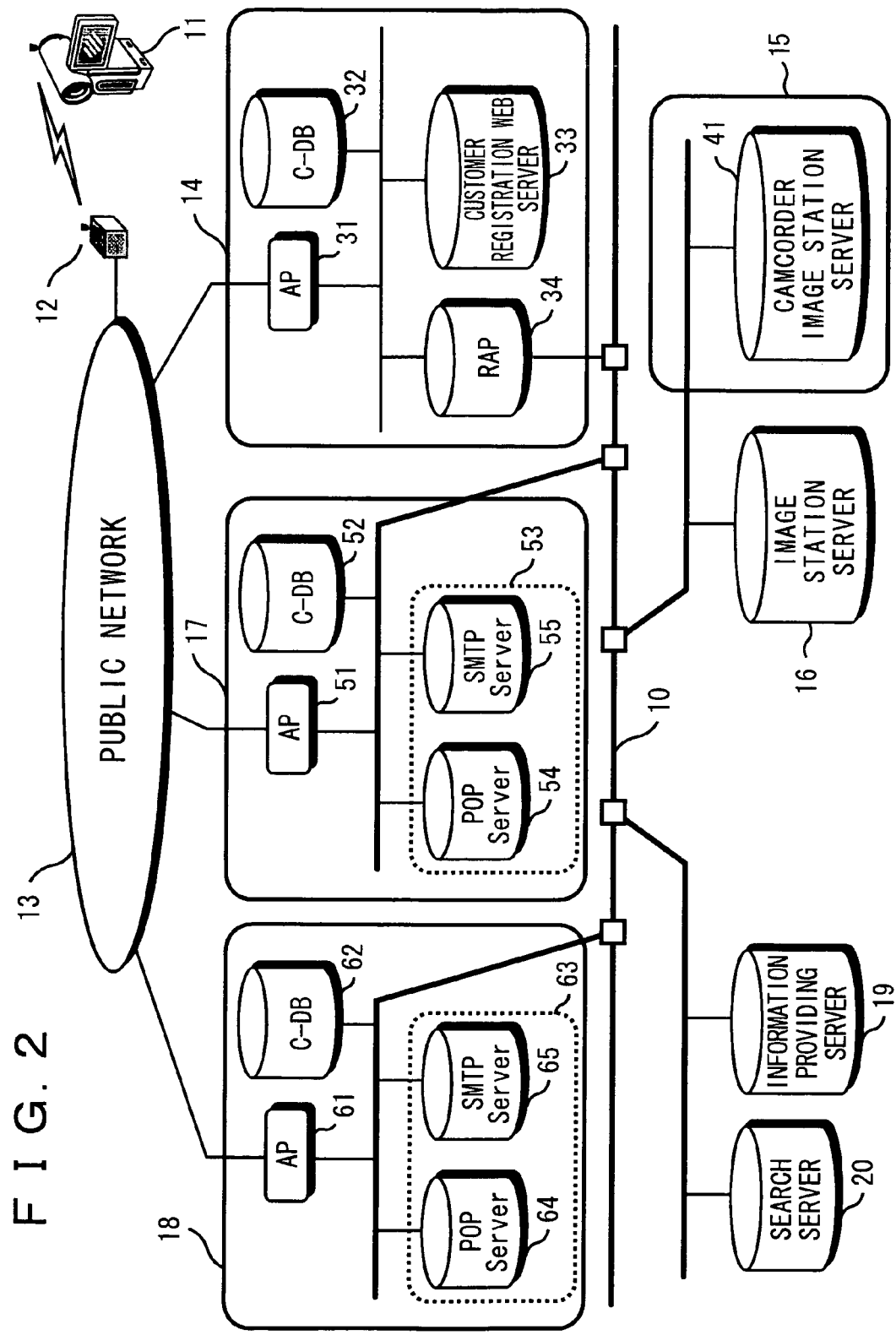
FIG. 2 is a view showing a configuration of a service providing system to which the present invention is applied.

FIG. 2 shows an example of a configuration of a service providing system to which the present invention is applied. In the present service providing system, a network system 14, a network service business center 15, an image station server 16, an Internet service provider A (ISP-A) 17, an Internet service provider B 18, an information providing server 19 and a search server 20 are connected to the Internet 10.

The network system 14, Internet service provider A 17 and Internet service provider B 18 are connected to a public network 13, and also a Bluetooth adapter 12 is connected to the public network 13. A camcorder 11 can establish a connection to the Bluetooth adapter 12 through short range radio communication based on the Bluetooth (trademark) and further establish a connection from the Bluetooth adapter 12 to the network system 14, Internet service provider A 17 or Internet service provider B 18 through the public network 13.

The network system 14 is composed of an access point (AP) 31, a customer database (C-DB) 32, a customer registration web server 33 and a registration authentication platform (RAP) 34.

The access point 31 is connected to the public network 13. The customer database 32 registers various kinds of information of a user who has purchased the camcorder 11. The customer registration web server 33 controls the registration process of the camcorder 11. The registration authentication platform 34 executes an authentication process of a user of the network system 14.

While the access point 31, customer database 32, customer registration web server 33 and registration authentication platform 34 are formed separately from one another in the example of FIG. 2, they may otherwise be formed integrally with one another.

The network service business center 15 has a camcorder image station 41. The camcorder image station 41 registers and manages image data transmitted thereto from the camcorder 11.

The image station server 16 registers and manages image data transmitted thereto from a personal computer not shown.

The Internet service provider A 17 includes an access point 51, a customer database 52 and a mail server 53. The mail server 53 in turn includes a POP server 54 and an STMP (Simple Mail Transfer Protocol) server 55.

The Internet service provider A 17 is a particular Internet service provider and is an Internet connection service provided by an enterprise same as the provider of the service providing system shown in FIG. 2 or a cooperating enterprise or the like.

The access point 51 performs a communication process with the public network 13. The customer database 52 registers various kinds of information of users of the Internet service provider A 17. The POP server 54 principally manages a process of transmission and reception of mails to and from the camcorder 11. The STMP server 55 principally manages transmission and reception of mails to and from another SMTP server (in the case of the present example, an STMP server 65 of the Internet service provider B 18).

The Internet service provider B 18 has an access point 61 and a customer database 62 and further has a mail server 63 which includes a POP server 64 and an STMP server 65. This basic configuration is similar to that of the Internet service provider A 17.

The information providing server 19 provides various kinds of information regarding, for example, commodities of a predetermined enterprise. The search server 20 provides a service of searching various kinds of information laid open through the Internet 10.

Figure 3:
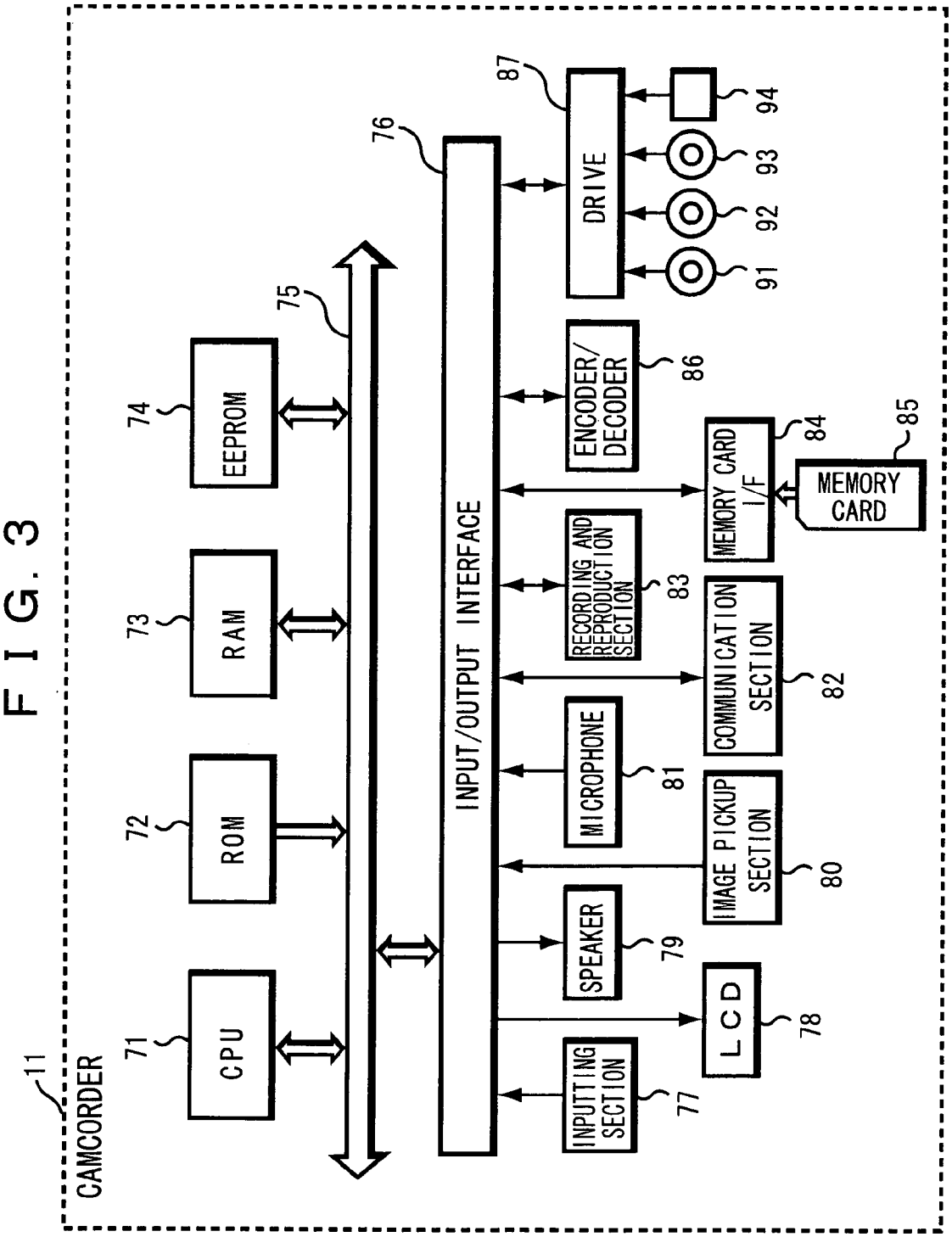
FIG. 3 is a block diagram showing a configuration of a camcorder of FIG. 2.

FIG. 3 shows an example of a configuration of the camcorder 11. The camcorder 11 is a video tape recorder integrated with a camera and has an accessing function to the Internet 10. Referring to FIG. 3, a CPU (Central Processing Unit) 71 executes various processes in accordance with a program stored in a ROM (Read Only Memory) 72 or a program loaded in a RAM (Random Access Memory) 73. Also data and so forth necessary for the CPU 71 to execute various processes are suitably stored into the RAM 73. An EEPROM (Electrically Erasable Programmable Read Only Memory) 74 stores data which need to be kept stored after the power supply is disconnected.

The CPU 71, ROM 72, RAM 73 and EEPROM 74 are interconnected by a bus 75. An input/output interface 76 is also connected to the bus 75.

An inputting section 77 including various buttons, switches and so forth, an LCD (Liquid Crystal Display) unit 78, a speaker 79, an image pickup section 80 formed from a CCD (Charge Coupled Device) image pickup device or the like, a microphone 81 for fetching a sound signal and a communication section 82 for performing short range radio communication with the Bluetooth adapter 12 based on the Bluetooth are connected to the input/output interface 76.

A recording and reproduction section 83 records image data picked up by the image pickup section 80, sound data collected by the microphone 81 and so forth onto a cassette magnetic tape loaded therein. Further, the recording and reproduction section 83 reproduces image data and sound data recorded on a cassette magnetic tape, outputs an image corresponding to the image data to the LCD unit 78 to display the same, and supplies sound data to the speaker 79 so that the sound data are outputted.

A memory card interface 84 executes, when a memory card 85 as a portable semiconductor memory is loaded therein, a writing process and a reading out process of data into and from the memory card 85. The memory card 85 can store image data picked up by the image pickup section 80 and sound data collected by the microphone 81 as well as various data acquired from the communication section 82 through the Internet 10.

When necessary, a drive 87 is connected to the input/output interface 76, and a magnetic disk 91, an optical disk 92, a magneto-optical disk 93, a semiconductor memory 94 or the like is suitably loaded into the drive 87 such that a computer program read out from the thus loaded medium is installed into the RAM 73 when necessary.

Figure 4:
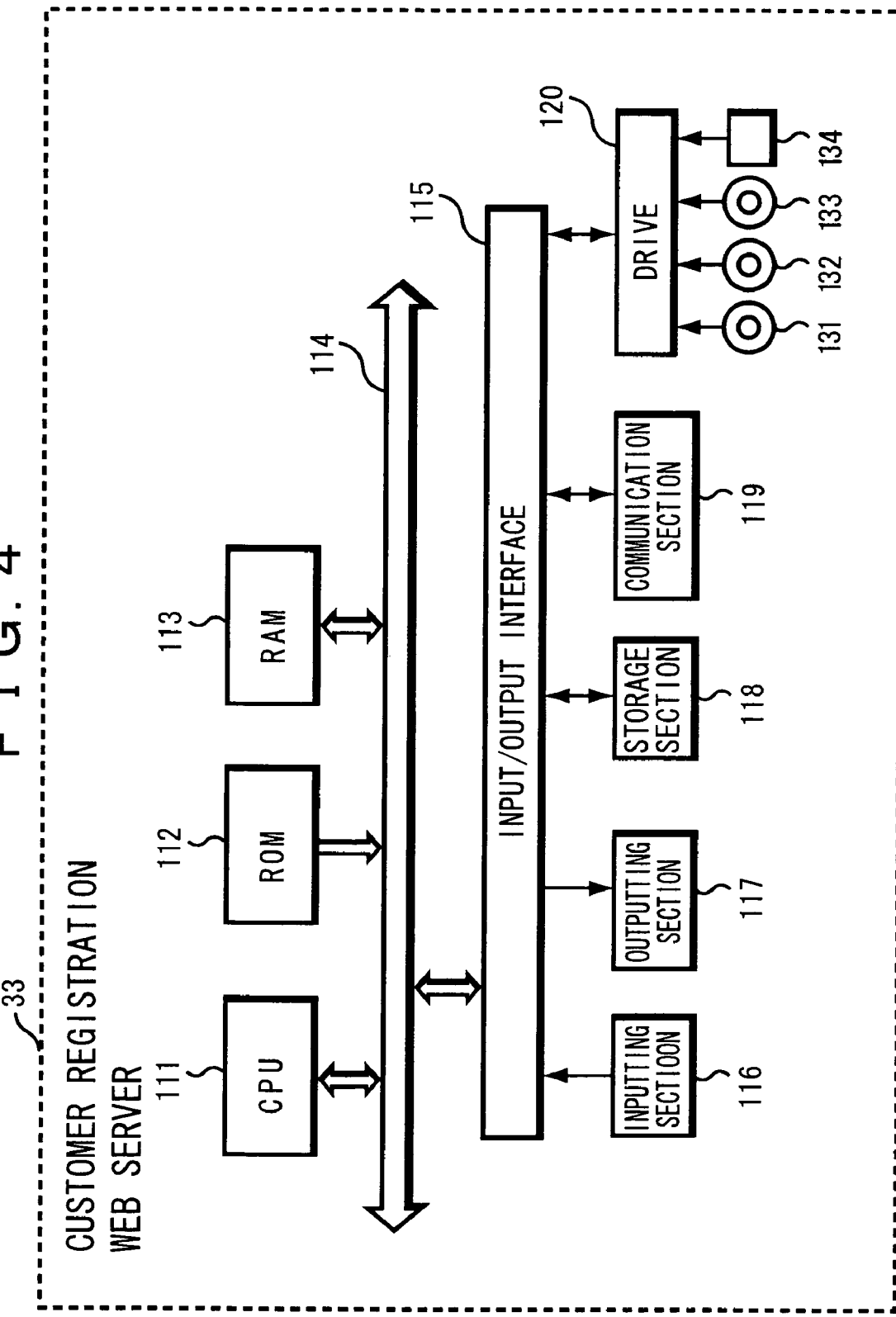
FIG. 4 is a block diagram showing a configuration of a customer registration web server of FIG. 2.

FIG. 4 shows an example of a configuration of the customer registration web server 33. Referring to FIG. 4, a CPU 111 executes various processes in accordance with a program stored in a ROM 112 or another program loaded from a storage section 118 into a RAM 113. Also data and so forth necessary for the CPU 111 to execute various processes are suitably stored into the RAM 113.

The CPU 111, ROM 112 and RAM 113 are interconnected by a bus 114. Also an input/output interface 115 is connected to the bus 114.

An inputting section 116 including a keyboard, a mouse and so forth, an outputting section 117 including a display unit formed from a CRT or an LCD unit and a speaker or the like, a storage section 118 formed from a hard disk or the like, and a communication section 119 including a modem, a terminal adapter and so forth are connected to the input/output interface 115. The communication section 119 performs a communication process through a network including the Internet 10.

When necessary, also a drive 120 is connected to the input/output interface 115, and a magnetic disk 131, an optical disk 132, a magneto-optical disk 133, a semiconductor memory 134 or the like is suitably loaded into the drive 120 such that a computer program read out from the thus load medium is installed into the storage section 118 when necessary.

Where the access point 31, customer database 32 and registration authentication platform 34 are formed separately from the customer registration web server 33, though not shown, they are formed in a basically similar configuration to that of the customer registration web server 33.

Figure 5:
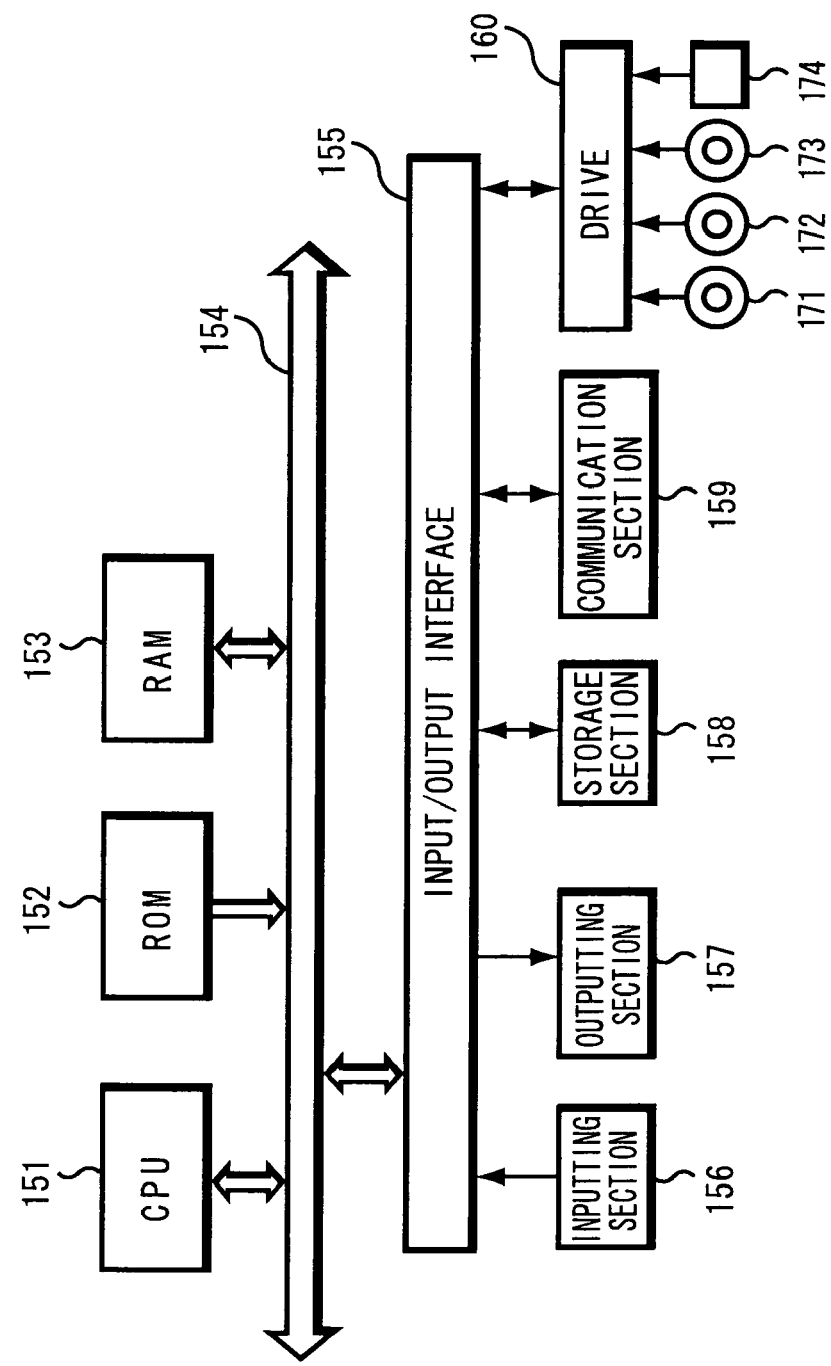
FIG. 5 is a block diagram showing a configuration of a camcorder image station of FIG. 2.

FIG. 5 shows an example of a configuration of the camcorder image station 41 which composes the network service business center 15. The components of the camcorder image station 41 from a CPU 151 to a semiconductor memory 174 have basically similar configurations to those of the components of the customer registration web server 33 of FIG. 4 from the CPU 111 to the semiconductor memory 134, and those components having like names have like functions. Accordingly, description of them is omitted herein to avoid redundancy.

Figure 6:
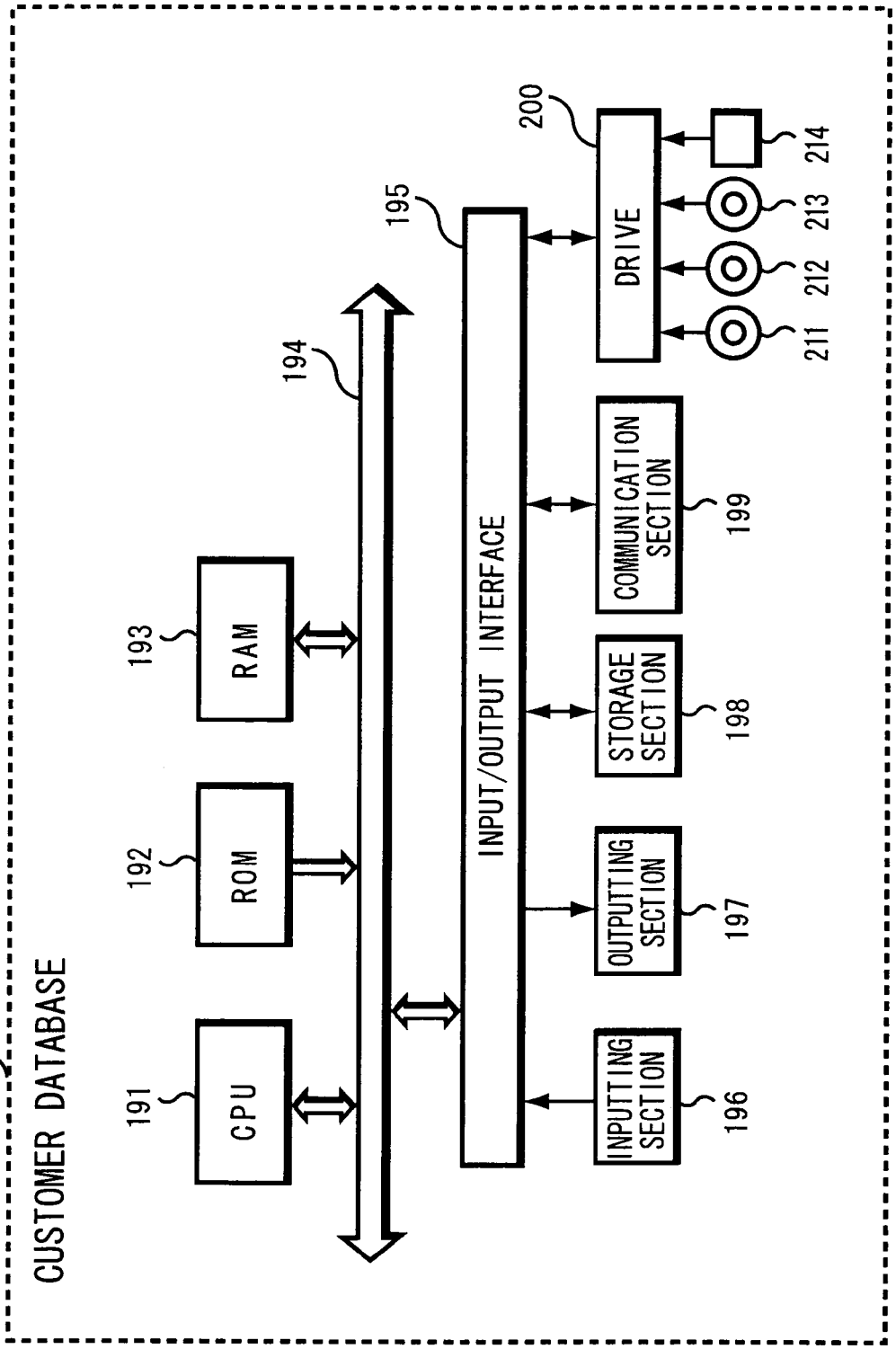
FIG. 6 is a block diagram showing a configuration of a customer database of FIG. 2.

FIG. 6 shows an example of a configuration of the customer database 52 of the Internet service provider A 17. Also components of the customer database 52 from a CPU 191 to a semiconductor memory 214 have basically similar configurations to those of the components of the customer registration web server 33 of FIG. 4 from the CPU 111 to the semiconductor memory 134, and those components having like names have like functions. Accordingly, description of them is omitted herein to avoid redundancy.

Where the access point 51 and the mail server 53 (POP server 54 and STMP server 55) are formed separately from the customer database 52, also they basically have a configuration similar to that of the customer database 52 of FIG. 6.

The user who has purchased the camcorder 11 can enjoy provision of services of the service providing system of FIG. 2. To this end, the user of the camcorder 11 executes a process of registering the camcorder 11 (its user) into the network system 14. If the camcorder 11 is purchased, then since the Bluetooth adapter 12 belongs to the camcorder 11 (if the Bluetooth adapter 12 does not belong, then it is purchased separately), the user can connect the Bluetooth adapter 12 to the public network 13 to register the camcorder 11 (its user) into the network system 14.

Figure 7:
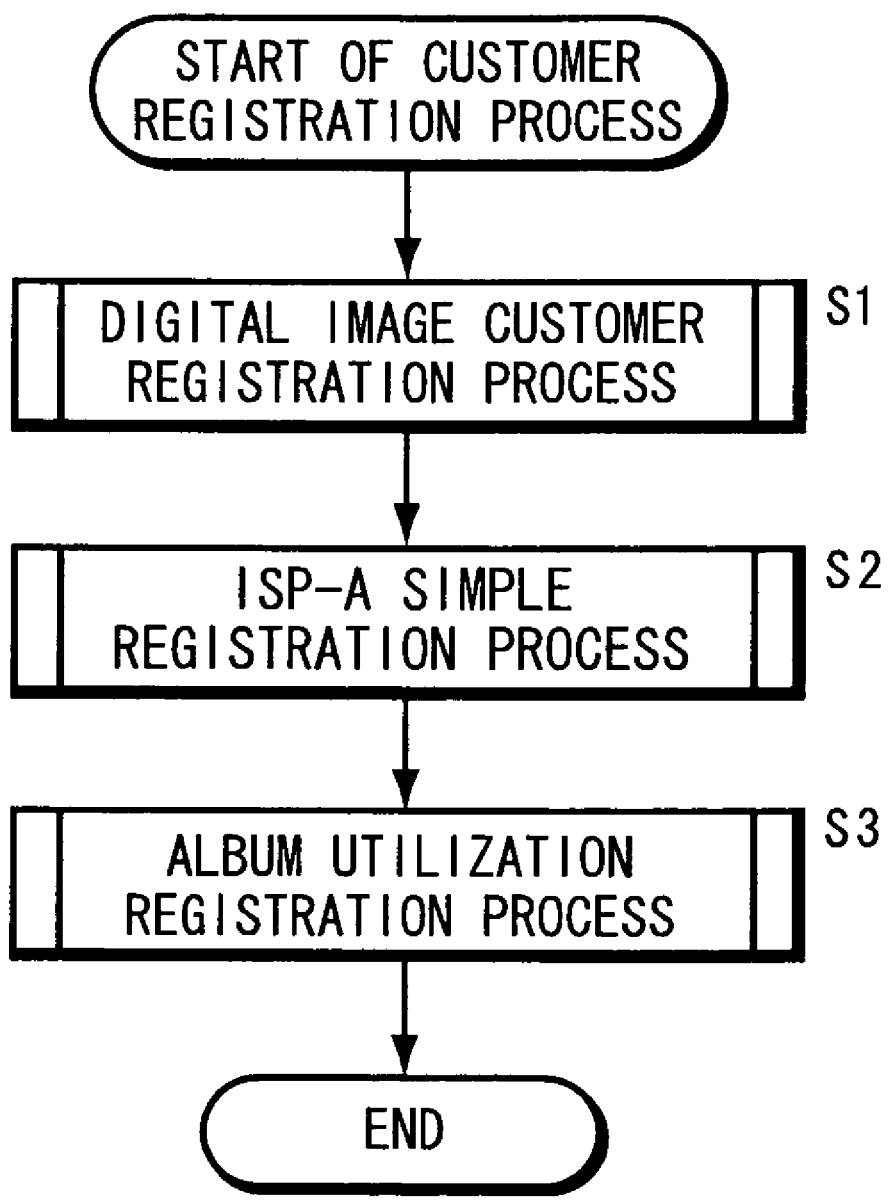
FIG. 7 is a flow chart illustrating a customer registration process of the service providing system of FIG. 2.

When the registration process is performed, a process illustrated in a flow chart of FIG. 7 is executed by the service providing system. In particular, at step S1, a digital image customer registration process is executed by the network system 14, and at step S2, an ISP-A simple registration process is executed by the Internet service provider A 17. Thereafter, at step S3, an album utilization registration process is executed by the network service business center 15.

Thus, the processes at steps S1 to S3 are described individually below.

Figure 8:
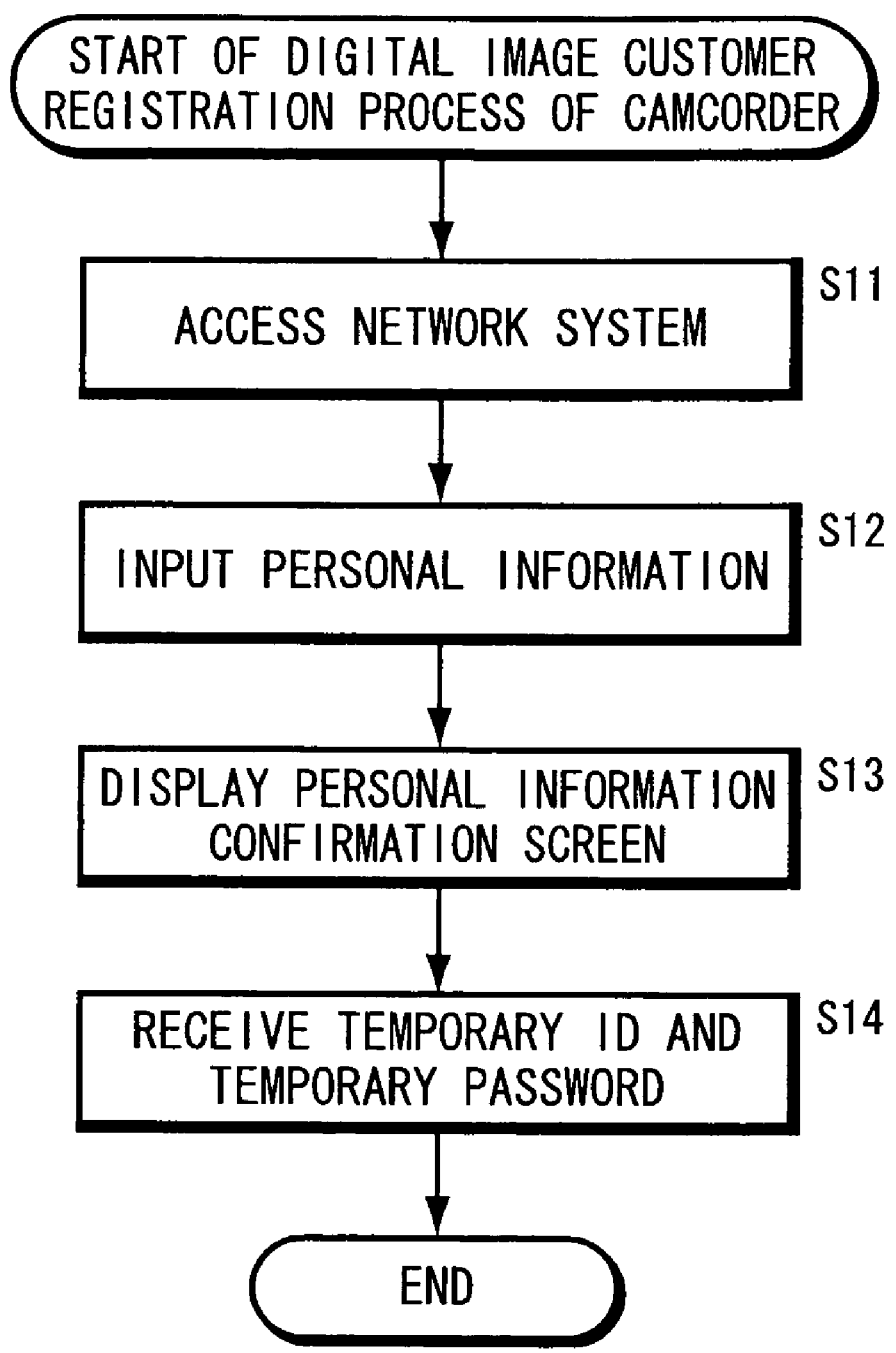
FIG. 8 is a flow chart illustrating a digital image customer registration process of the camcorder of FIG. 2.

First, the digital image customer registration process by the network system 14 is described with reference to flow charts of FIGS. 8 and 9. FIG. 8 illustrates a process of the camcorder 11 when the registration process is performed, and FIG. 9 illustrates a corresponding process of the customer registration web server 33.

At step S11, the user of the camcorder 11 will operate the inputting section 77 to issue an instruction to access the network system 14. This access destination is stored in advance in the ROM 72. The CPU 71 controls the communication section 82 based on the information stored in the ROM 72 to issue an instruction to access the access point 31 of the network system 14. Upon reception of the instruction, the communication section 82 communicates with the Bluetooth adapter 12 by short-range radio communication to access the access point 31 of the network system 14 through the public network 13 from the Bluetooth adapter 12.

A guest ID is utilized for the first access to the network system 14. In particular, if the user inputs, for example, "GUEST" as an ID, then the registration authentication platform 34 permits the access. When the registration authentication platform 34 permits the access from the camcorder 11, it passes the management right of a process for the camcorder 11 to the customer registration web server 33.

Figure 9:
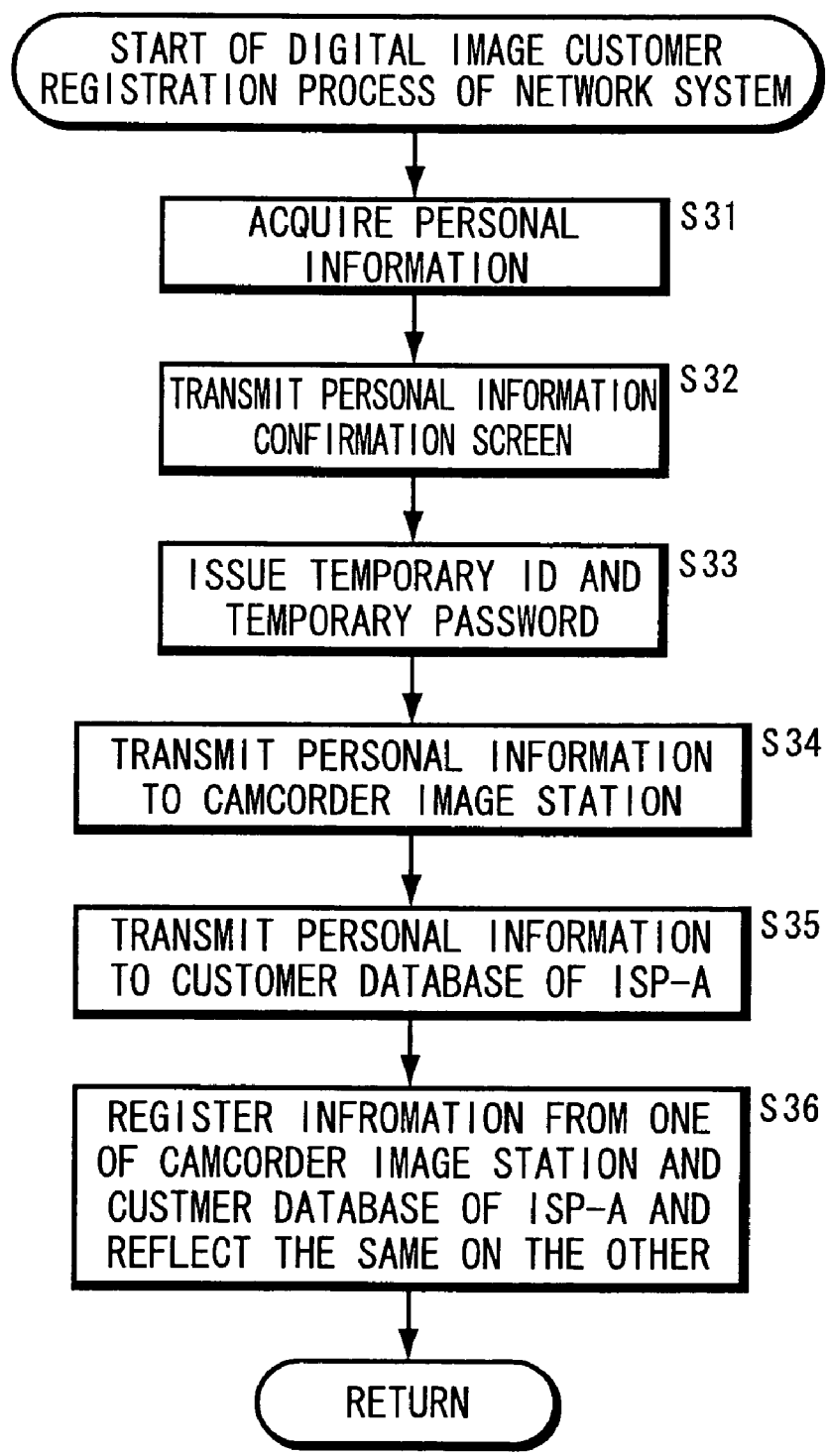
FIG. 9 is a flow chart illustrating a digital image customer registration process of the network system of FIG. 2.

The CPU 111 of the customer registration web server 33 thereupon issues a request to the user of the camcorder 11 to input personal information at step S31 of FIG. 9. This request is outputted from the communication section 119 and transmitted to the camcorder 11 through the access point 31, public network 13 and Bluetooth adapter 12.

When the CPU 71 of the camcorder 11 receives the request through the communication section 82, it outputs a message corresponding to the request to the LCD unit 78 to display the message at step S12.

The user of the camcorder 11 will operate the inputting section 77 to input its personal information based on the message. The personal information includes a registration code of the camcorder 11 including a numerical value of 16 figures and an alphabetical letter or letters (the registration code is recorded on a postal card annexed to the camcorder 11 when the camcorder 11 is purchased), the zip code, the name, the address, the date of birth, the sex, a telephone number, an electronic mail address and so forth of the user, the product number (serial number) of the camcorder 11, the date of purchase and so forth.

When the CPU 71 of the camcorder 11 receives such personal information as an input thereto, it causes the personal information to be transmitted to the network system 14 at step S12.

In particular, the CPU 71 controls the communication section 82 to transmit the inputted personal information to the network system 14. The personal information is supplied to the customer registration web server 33 through the Bluetooth adapter 12, public network 13 and access point 31.

When the CPU 111 of the customer registration web server 33 acquires the personal information through the communication section 119 at step S31 of FIG. 9, it supplies the personal information to the RAM 113 to temporarily store the personal information.

After the personal information is registered into the RAM 113, the CPU 111 produces a personal information confirmation screen and transmits it from the communication section 119 to the camcorder 11 at step S32. The data of the personal information confirmation screen are supplied from the access point 31 to the Bluetooth adapter 12 through the public network 13 and transmitted from the Bluetooth adapter 12 to the camcorder 11.

When the CPU 71 of the camcorder 11 receives the data of the personal information confirmation screen through the communication section 82, it stores the data once into the RAM 73 and then reads out and outputs the data to the LCD unit 78 so that the data are displayed on the LCD unit 78 at step S13 of FIG. 8. Consequently, the personal information inputted by the user of the camcorder 11 is displayed for confirmation on the LCD unit 78.

If the user operates the inputting section 77 to input the fact that the user has confirmed the personal information inputted by itself, then the CPU 71 transmits the confirmation signal from the communication section 82 to the customer registration web server 33.

When the CPU 111 of the customer registration web server 33 receives the confirmation signal through the communication section 119, it transfers the personal information registered in the RAM 113 to the storage section 118 to store the personal information at step S32 of FIG. 9.

Then at step S33, the CPU 111 issues a temporary ID and a temporary password to the user of the camcorder 11. The temporary ID and the temporary password are outputted from the communication section 119 and transmitted to the camcorder 11 through the access point 31, public network 13 and Bluetooth adapter 12.

When the CPU 71 of the camcorder 11 receives the temporary ID and the temporary password through the communication section 82 at step S14 of FIG. 8, it either supplies them to the LCD unit 78 to display them or supplies them to the EEPROM 74 to store them.

The customer registration web server 33 supplies the personal information of the user of the camcorder 11 registered in the storage section 118 in such a manner as described above to the customer database 32 to register the personal information at step S33.

At step S34, the customer database 32 supplies the personal information to the camcorder image station 41 of the network service business center 15 through the Internet 10.

When the CPU 151 of the camcorder image station 41 receives the personal information transmitted thereto from the network system 14 through the communication section 159, it supplies the received personal information to the storage section 158 to store the personal information (at step S121 of FIG. 16 which is hereinafter described).

At step S35, the customer database 32 further transmits the personal information of the camcorder 11 to the customer database 52 of the Internet service provider A 17.

The customer database 52 of the Internet service provider A 17 registers the personal information of the camcorder 11 transmitted thereto from the network system 14 through the Internet 10 (step S71 of FIG. 11 hereinafter described).

It is to be noted that, when the personal information of the user of the camcorder 11 is changed in the network service business center 15 later, the customer database 32 of the network system 14 receives the changed personal information from the camcorder image station 41 through the Internet 10 and registers it into the customer database 32 itself at step S36. Further, the customer database 32 supplies the updated personal information through the Internet 10 to the customer database 52 of the Internet service provider A 17 to register the personal information.

On the contrary, if the user of the camcorder 11 changes the personal information in the Internet service provider A 17, then since this is registered into the customer database 52, the customer database 52 notifies the customer database 32 of the network system 14 of the changed personal information through the Internet 10. The customer database 32 overwrites the old personal information with the inputted personal information to update the personal information.

At this time, the customer database 32 further transmits the updated personal information to the camcorder image station 41 of the network service business center 15 through the Internet 10.

The camcorder image station 41 updates the old personal information with the inputted personal information.

After the personal information in one of the network system 14, network service business center 15 and Internet service provider A 17 is updated in such a manner as described above, this is reflected immediately on the other two of them.

After the user of the camcorder 11 is registered into the customer database 32 of the network system 14 in such a manner as described above, the network system 14 thereafter notifies the user of the camcorder 11 of various kinds of information regarding the camcorder 11 through the Internet 10 or using a postal card when necessary.

After the digital image customer registration process is completed in such a manner as described above, the ISP-A simple registration process is executed. In particular, after the customer registration process is completed, the customer registration web server 33 passes the management right of a later process for the camcorder 11 to the customer database 52 of the Internet service provider A 17.

Figure 10:
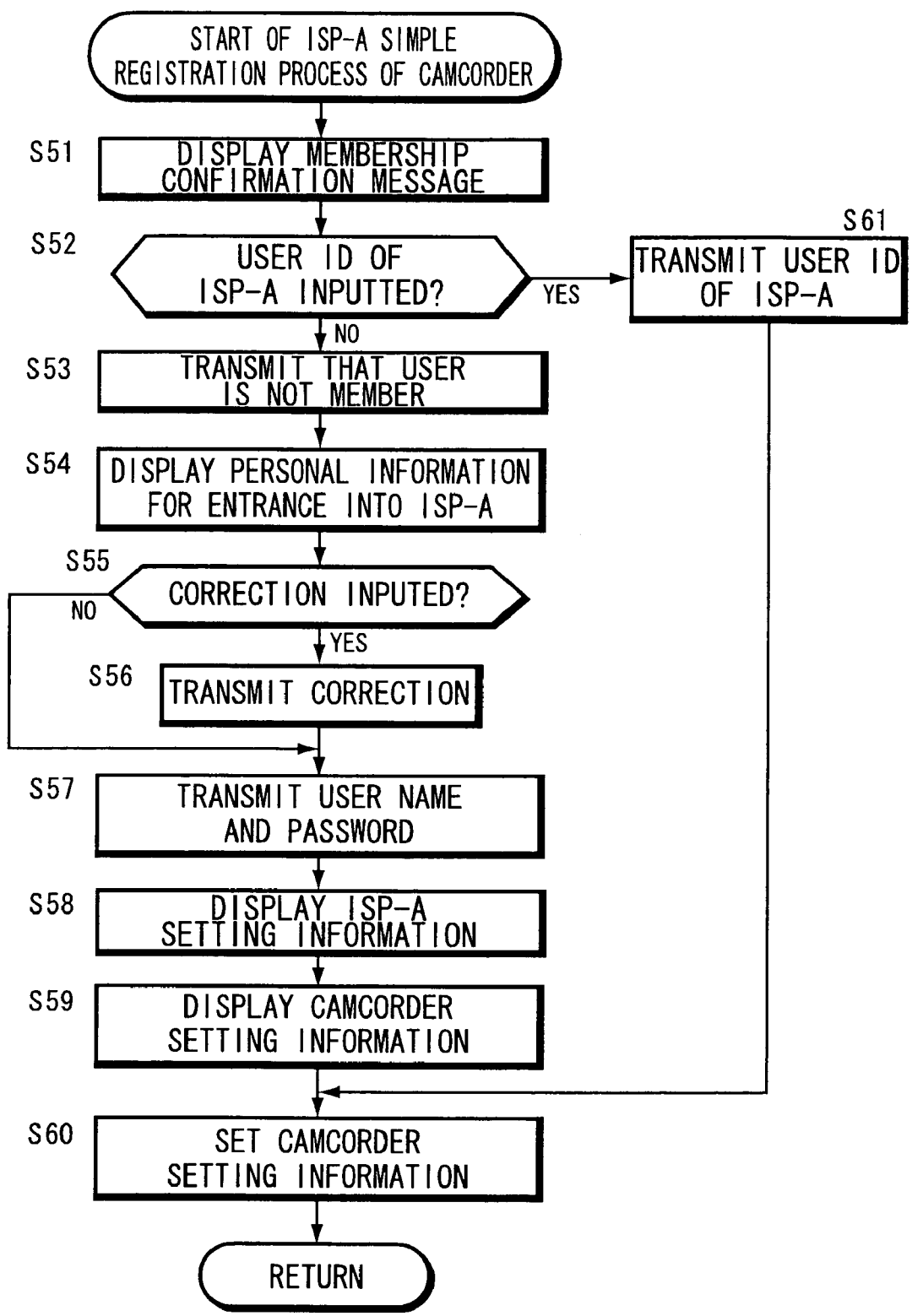
FIG. 10 is a flow chart illustrating an ISP-A simple registration process of the camcorder of FIG. 2.

Accordingly, the ISP-A simple registration process is executed later between the camcorder 11 and the customer database 52 of the Internet service provider A 17. FIG. 10 illustrates a process of the camcorder 11 in the present case, and FIG. 11 illustrates a corresponding process of the customer database 52.

Figure 11:
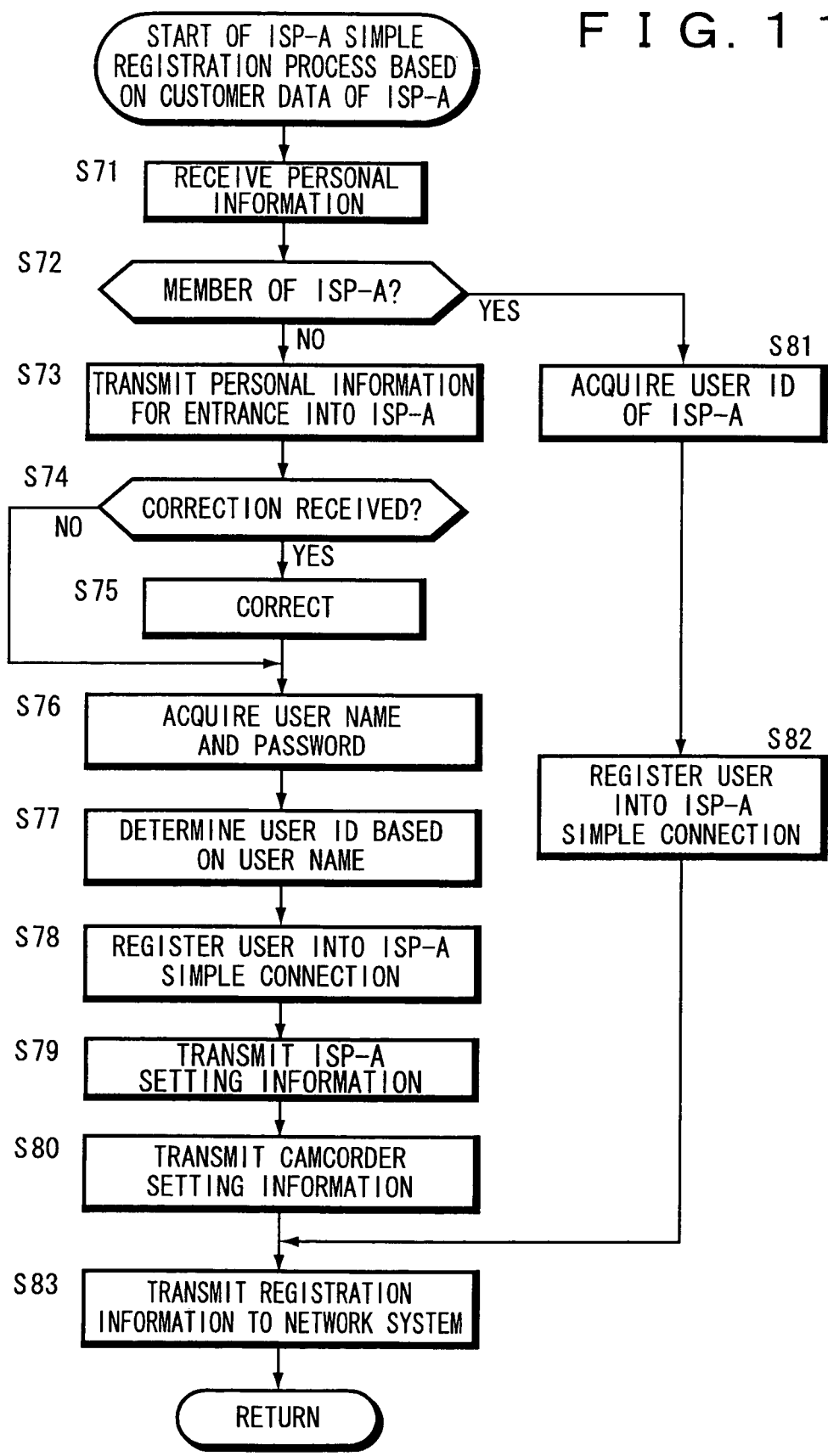
FIG. 11 is a flow chart illustrating an ISP-A simple registration process of the customer database of an Internet service provider A of FIG. 2.

When the CPU 191 of the customer database 52 of the Internet service provider A 17 receives, at step S71 of FIG. 11, the personal information transmitted from the customer database 32 of the network system 14 at step S35 of FIG. 9, it supplies the received personal information to the storage section 198 to store the personal information.

When the customer database 52 of the Internet service provider A 17 receives the personal information of the camcorder 11 at step S71, it requests the camcorder 11 for the user to input whether or not the user already is a member of the Internet service provider A 17 and further to input, if the user is a member of the Internet service provider A 17, its user ID of the Internet service provider A 17.

When the CPU 71 of the camcorder 11 receives the request at step S51 of FIG. 10, it outputs a corresponding message to the LCD unit 78 to display the message. The user will observe the display and operate, if the user itself is a member of the Internet service provider A 17 already, the inputting section 77 to input its user ID. On the other hand, if the user is not a member of the Internet service provider A 17, then this will be inputted. The CPU 71 of the camcorder 11 discriminates at step S52 whether or not a user ID of the Internet service provider A 17 is inputted. If the information that the user is not a member of the Internet service provider A 17 is inputted, then, at step S53, the CPU 71 causes the communication section 82 to transmit the information to the customer database 52 of the Internet service provider A 17.

When the CPU 191 of the customer database 52 receives the input through the communication section 191, it discriminates at step S72 of FIG. 11 that the user is not a member of the Internet service provider A 17, and the processing advances to step S73, at which the CPU 191 of the customer database 52 transmits personal information for entrance into the Internet service provider A 17. As the personal information, the information transmitted from the network system 14 by the processing at step S35 of FIG. 9 and received and stored at step S71 is used basically as it is.

When the CPU 71 of the camcorder 11 receives personal information for entrance into the Internet service provider A 17 through the communication section 82 at step S54 of FIG. 10, it outputs the personal information to the LCD unit 78 to display the personal information.

Since this personal information is personal information inputted when the user of the camcorder 11 performed user registration into the network system 14, basically it includes no error. However, to make sure, the user will watch the display and discriminate whether or not it is necessary to correct the personal information. If it is necessary to correct the personal information, then the user will operate the inputting section 77 to input correction.

Thus, the CPU 71 of the camcorder 11 discriminates at step S55 whether or not correction is inputted. If correction is inputted, then, at step S56, the CPU 71 of the camcorder 11 causes the communication section 82 to transmit a corrected item to the customer database 52 of the Internet service provider A 17. If no correction is inputted, then the process at step S56 is skipped.

The CPU 191 of the customer database 52 of the Internet service provider A 17 discriminates at step S74 of FIG. 11 whether or not correction is received through the communication section 199. If correction is received, then the CPU 191 corrects, at step S75, the personal information registered already based on the received correction contents. If correction is not received, then the process at step S75 is skipped.

As the personal information, the personal information registered upon user registration into the network system 14 by the user who purchased the camcorder 11 is displayed basically as it is as described hereinabove (from within the personal information, only information necessary for the user to become a member of the Internet service provider A 17 is displayed). Accordingly, the user need not input items basically similar to those inputted for user registration into the network system 14 again in order to become a member of the Internet service provider A 17. Accordingly, the operability is improved.

Then, at step S57, the CPU 71 of the camcorder 11 causes the LCD unit 78 to display a message for urging the user to input the user name and its password in accordance with an input guidance from the customer database 52. The user of the camcorder 11 will operate the inputting section 77 in accordance with the message to input the user name and the password which are used by the user to utilize the Internet service provider A 17. The CPU 71 transmits the inputted user name and the password to the customer database 52 of the Internet service provider A 17 through the communication section 82.

When the CPU 191 of the customer database 52 receives the user name and the password through the communication section 199 at step S76, it discriminates based on the data stored in the storage section 198 whether or not the user name and the password are used by some other user already. If they are used, then a message representing this is transmitted from the communication section 199 to the camcorder 11.

When the CPU 71 of the camcorder 11 receives this message through the communication section 82, it causes the LCD unit 78 to display the message. If the user of the camcorder 11 watches the display and discriminates that the inputted user name and the password are registered already, then the user will input a new user name and password.

When the user name and the password are transmitted from the camcorder 11 in such a manner as described above, the CPU 191 of the customer database 52 acquires them through the communication section 199 at step S76 of FIG. 11 and determines a user ID based on the user name at step S77. This user ID is a user ID as a member of the Internet service provider A 17.

In the present service providing system, a common ID and a common password can be used for the network system 14, network service business center 15 and Internet service provider A 17. However, a temporary ID and a temporary password are already set for the user of the camcorder 11 at a stage when user registration was performed in the network system 14 as described above (step S14 of FIG. 8 and step S33 of FIG. 9).

In order to make it possible for the user to enjoy a service of the Internet service provider A 17 based on the temporary ID and the temporary password, the CPU 191 prepares a table in which a matching relationship for matching the temporary ID and the temporary password issued from the network system 14 at step S33 of FIG. 9 and received by the process at step S71 with the user ID determined at step S77 and registers the table to an ISP-A simple registration.

Consequently, if the user of the camcorder 11 accesses the Internet service provider A 17 based on the temporary ID and the temporary password issued from the network system 14 at step S33 of FIG. 9 and received by the camcorder 11 at step S14 of FIG. 8, then the customer database 52 searches for the user ID corresponding to the temporary ID and the temporary password in the table to allow the user of the camcorder 11 to utilize a service provided by the Internet service provider A 17.

When the registration of the user of the camcorder 11 as a member of the Internet service provider A 17 is completed in such a manner as described, the CPU 191 transmits, at step S79, setting information necessary to access the Internet service provider A 17 to the camcorder 11.

When the CPU 71 of the camcorder 11 receives the ISP-A setting information from the Internet service provider A 17 at step S58 of FIG. 10, it outputs the ISP-A setting information to the LCD unit 78 to display the ISP-A setting information. Consequently, the user can confirm the ISP-A setting information. The ISP-A setting information describes, for example, as shown in FIG. 12, PPP login, a PPP password, an access point telephone number, a POP ID, a POP password, an E-mail address, a POP server, an SMTP mail server, a News server and so forth.

The user of the camcorder 11 will take notes of the contents illustrated in FIG. 12 when necessary and operate the inputting section 77 to output a signal of confirmation to the Internet service provider A 17.

The customer database 52 of the Internet service provider A 17 transmits camcorder setting information at step S80.

At step S59 of FIG. 10, the camcorder 11 receives the camcorder setting information and causes the LCD unit 78 to display the information.

FIG. 13 illustrates an example of camcorder setting information transmitted from the customer database 52 to the camcorder 11 in this manner. In the present example, the camcorder setting information includes a DI customer ID, a DI password and an access point telephone number.

The access point telephone number represents a telephone number of a point to be accessed when the camcorder 11 establishes a connection to the Internet 10, more particularly of the access point 51 of the Internet service provider A 17.

The user of the camcorder 11 will operate, at step S60 of FIG. 10, the inputting section 77 to set the camcorder setting information displayed in this manner to the camcorder 11 as conditions for establishing a connection to the Internet 10. This setting is stored into the EEPROM 74.

For example, if a user who has purchased a personal computer tries to establish a connection to the Internet 10 through an ordinary service provider (in the example of FIG. 2, the Internet service provider B 18), then it is necessary for the user to set such 12 items as shown in FIG. 14A including an ID for PPP connection, a password for PPP connection, an access point telephone number, a Primary DNS Server, a Secondary DNS Server, a Proxy Server, a Port Number, an ID for POP authentication, a password for POP authentication, a POP server, an SMTP server and a mail address. In contrast, where the user who has purchased the camcorder 11 performs the ISP-A simple registration process, it is only necessary for the user of the camcorder 11 to set a Unified ID (corresponding to the DI customer ID of FIG. 13), a password (corresponding to the DI password of FIG. 13) and an access point telephone number (corresponding to the access point telephone number of FIG. 13) as shown in FIG. 14B. Accordingly, even a user who is not familiar with a setting operation can simply perform an operation for connection to the Internet.

If the user itself of the camcorder 11 is a member of the Internet service provider A 17 already, then the user will operate the inputting section 77 based on a request from the customer database 52 to input the user ID of the Internet service provider A 17. Thus, in this instance, if the CPU 71 of the camcorder 11 acquires the user ID of the Internet service provider A 17 inputted from the user, then it causes the communication section 82 to transmit the user ID of the Internet service provider A 17 to the customer database 52 at step S61 of FIG. 10. Thereafter, the processing advances to step S60.

When the CPU 191 of the customer database 52 of the Internet service provider A 17 receives and acquires, at step S81 of FIG. 11, the user ID of the Internet service provider A 17 transmitted thereto from the camcorder 11, it prepares, at step S82, a table which describes a matching relationship for matching the user ID of the Internet service provider A 17 with the temporary ID and the temporary password included in the personal information of the user received by the process at step S71, and registers the table to the ISP-A simple registration.

The user will operate the inputting section 77 to set the camcorder setting information as conditions for connection to the Internet 10 to the camcorder 11 at step S60 of FIG. 10. This setting is stored into the EEPROM 74.

The processing advances, after the processes at steps S80 and S82 of FIG. 11, to step S83, at which the CPU 191 of the customer database 52 transmits the information registered by the processing till then or, if the registered information is updated by the user, transmits the updated information to the network system 14.

When the customer database 32 of the network system 14 receives the registration information from the Internet service provider A 17, it registers the information into the customer database 32 and transmits the information also to the camcorder image station 41 of the network service business center 15 so that the information may be reflected.

Next to such an ISP-A simple registration process as described above, the album utilization registration process is executed. This album utilization registration process is further described with reference to flow charts of FIGS. 15 and 16. FIG. 15 illustrates an album utilization registration process of the camcorder 11, and FIG. 16 illustrates a corresponding album utilization registration process of the camcorder image station 41.

After the simple registration process of the Internet service provider A 17 is completed, the CPU 191 of the customer database 52 of the Internet service provider A 17 passes the management right for processing of the camcorder 11 to the camcorder image station 41 of the network service business center 15.

Figure 16:
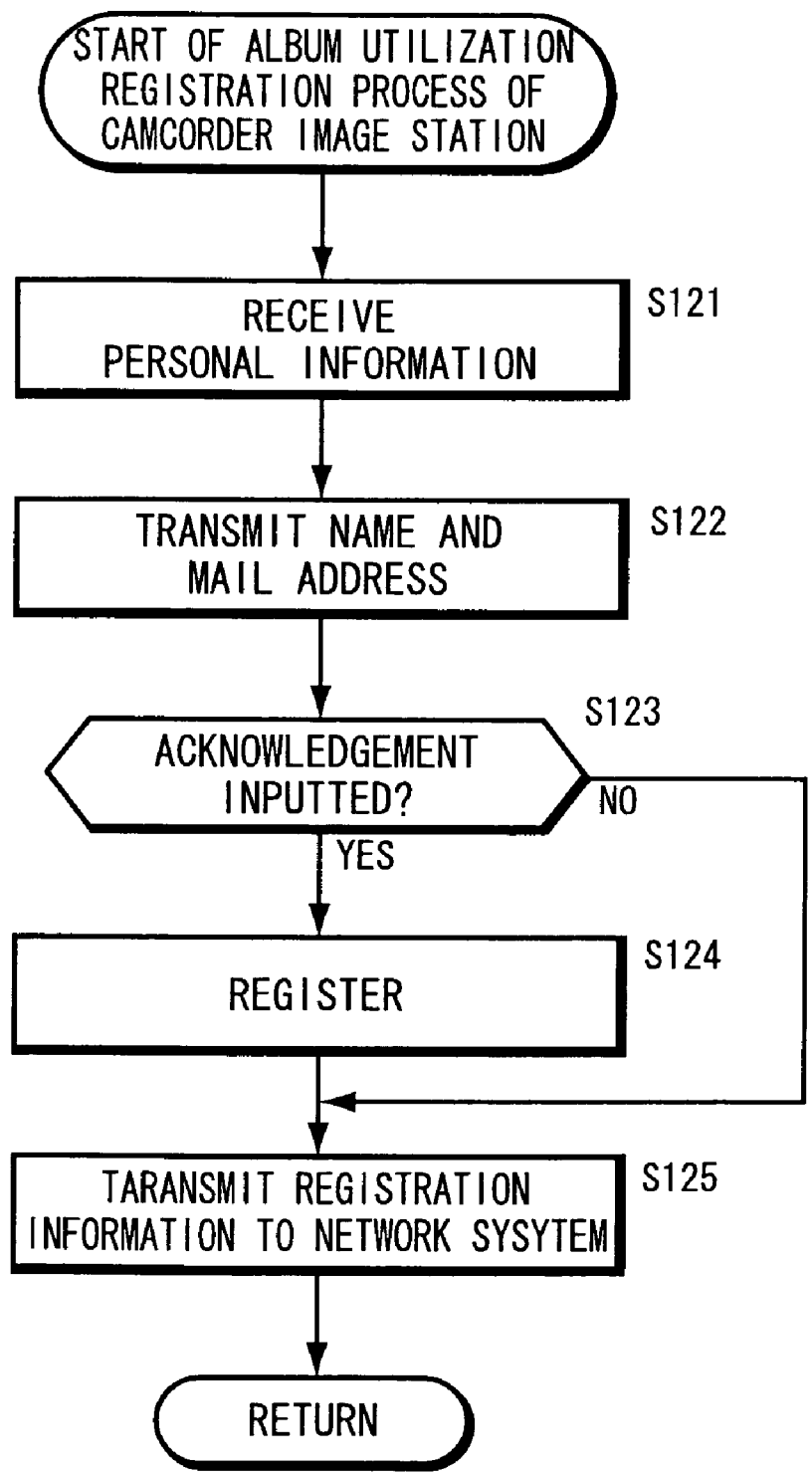
FIG. 16 is a flow chart illustrating an album registration utilization process of the camcorder image station of FIG. 2.

When the CPU 151 of the camcorder image station 41 receives the personal information of the camcorder 11 transmitted at step S34 of FIG. 9 from the customer database 32 of the network system 14 through the communication section 159 at step S121 of FIG. 16, it supplies the received personal information to the storage section 158 to store the personal information. The CPU 151 reads out the name and the mail address of the received personal information and transmits them to the camcorder 11 ate step S122.

When the CPU 71 of the camcorder 11 receives the name and the mail address from the camcorder image station 41, it outputs them to the LCD unit 78 to display them at step S101. The user of the camcorder 11 will watch the display and discriminate whether or not the name and the mail address of the user itself are correct. It is to be noted that the mail address (E-mail address) was set in the membership registration into the Internet service provider A 17 (FIG. 12).

If the user of the camcorder 11 confirms that the name and the mail address are correct, then it will operate the inputting section 77 to input, if it acknowledges to use the name and the mail address for album utilization registration, this information. Thus, at step S102, the CPU 71 discriminates whether or not acknowledgement is inputted, and if acknowledgement is inputted, then the processing advances to step S103, at which the CPU 71 causes an acknowledgement signal corresponding to the input to be transmitted to the camcorder image station 41.

On the other hand, if the user does not acknowledge such album utilization registration, it will operate the inputting section 77 to input this. In this instance, the CPU 71 causes a non-acknowledgement signal, which represents that the album utilization registration is not acknowledged, to be transmitted to the camcorder image station 41 at step S104.

The CPU 151 of the camcorder image station 41 discriminates at step S123 of FIG. 16 whether or not an acknowledgement signal is inputted. If an acknowledgement signal is inputted, then the processing advances to step S124, at which the CPU 151 of the camcorder image station 41 stores the personal information received at step S121 into the storage section 158.

On the other hand, if it is discriminated at step S123 that an acknowledgement signal is not inputted, then the process at step S124 is skipped.

The personal information corresponding to the temporary ID and the temporary password issued by the network system 14 are registered into the camcorder image station 41 in this manner.

Thereafter, at step S125, if an input to update the registration information is received from the user, the CPU 151 of the camcorder image station 41 transmits this to the network system 14.

The customer database 32 of the network system 14 registers the updated information into itself and besides transmits the updated information to the customer database 52 of the Internet service provider A 17 to register the updated information.

It is to be noted that, after the customer database 32 of the network system 14 issues a temporary ID and a temporary password, it mails a postal card on which a regular ID and a regular password are recorded to the address of the user. When the user receives the postal card, it will replace the temporary ID and the temporary password with the regular ID and the regular password and use them.

After the regular ID and the regular password are issued, the customer database 32 transmits them to the network service business center 15 and the Internet service provider A 17 through the Internet 10. The regular ID and the regular password are registered both into the network service business center 15 and the Internet service provider A 17. The temporary ID and the temporary password can be utilized only within a predetermined period (for example, two weeks) after they are issued, and each of the network system 14, network service business center 15 and Internet service provider A 17 considers the temporary ID and the temporary password valid only within two weeks and rejects, if the temporary ID and the temporary password are used after the term of validity is expired, the accessing.

It is to be noted that, while, in the foregoing description, user registration is performed from the camcorder 11 into the network system 14, it is otherwise possible to use a personal computer to perform user registration through the Internet 10 or perform user registration using a postal card.

Figure 17:
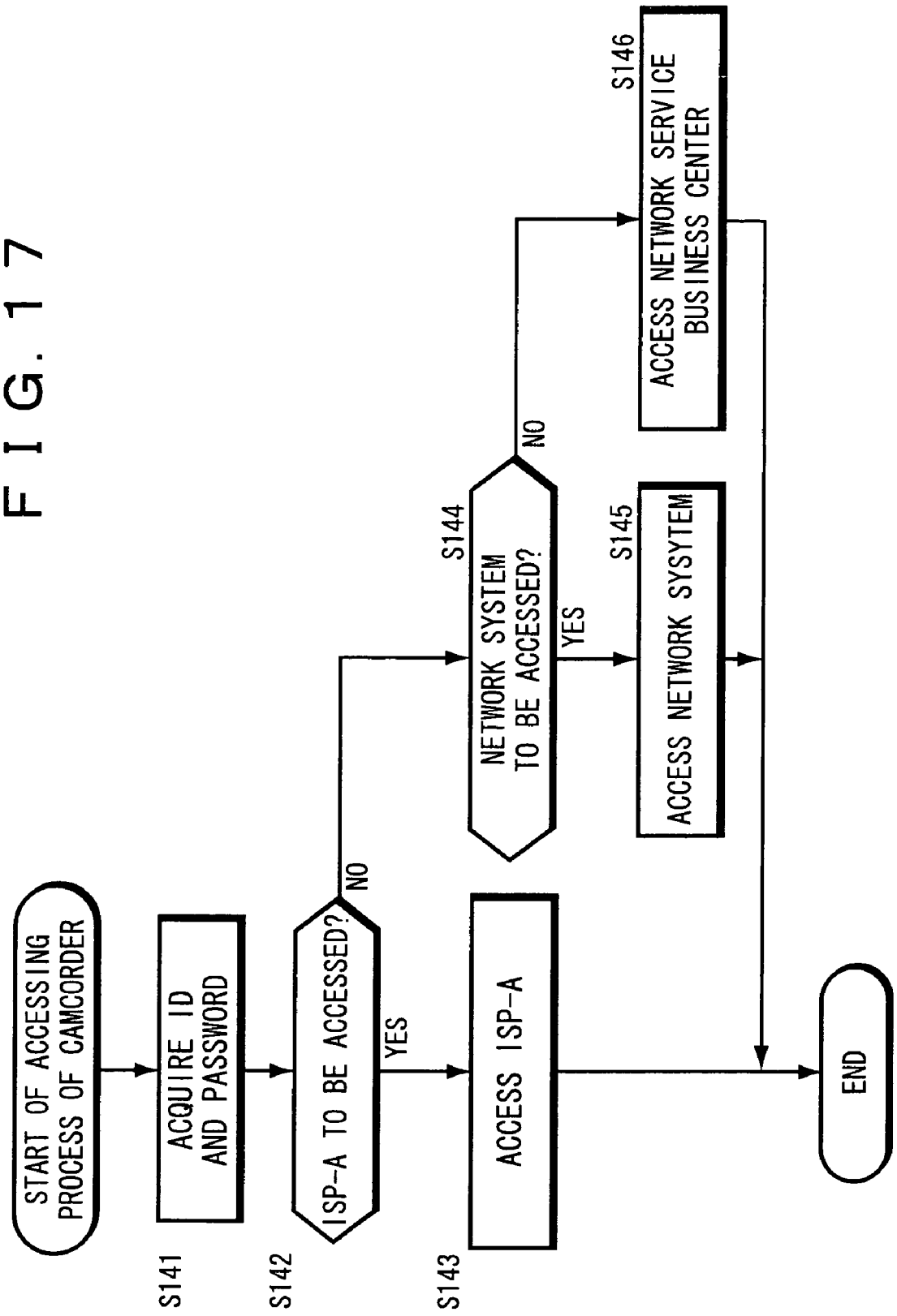
FIG. 17 is a flow chart illustrating an access process of the camcorder of FIG. 2.

Now, a process when the camcorder 11 establishes a connection to the network system 14, network service business center 15 or Internet service provider A 17 is described with reference to a flow chart of FIG. 17. The user will operate the inputting section 77 to input the temporary ID and the temporary password allocated upon user registration into the network system 14 (or the regular ID and the regular password set later). At step S141, the CPU 71 acquires the inputted ID and password based on the operation of the inputting section 77 by the user. Further, the CPU 71 discriminates at step S142 whether or not the access destination designated by the user is the Internet service provider A 17.

If the destination to be accessed is the Internet service provider A 17, then the processing advances to step S143, at which the CPU 71 uses the inputted ID and password to execute a process of accessing the Internet service provider A 17. In this instance, since the customer database 52 of the Internet service provider A 17 has the conversion table as described hereinabove, the Internet service provider A 17 discriminates based on the conversion table whether or not the user of the camcorder 11 is a legal user.

If it is discriminated at step S142 that the access destination is not the Internet service provider A 17, the processing advances to step S144, at which the CPU 71 discriminates whether or not the access destination is the network system 14. If the access destination is the network system 14, then the processing advances to step S145, at which the CPU 71 accesses the network system 14 based on the ID and the password acquired at step S141. Similarly, if it is discriminated at step S144 that the access destination is not the network system (if it is discriminated that the access destination is the network service business center 15), the processing advances to step S146, at which the CPU 71 utilizes the ID and the password acquired at step S141 to access the network service business center 15.

Figure 18:
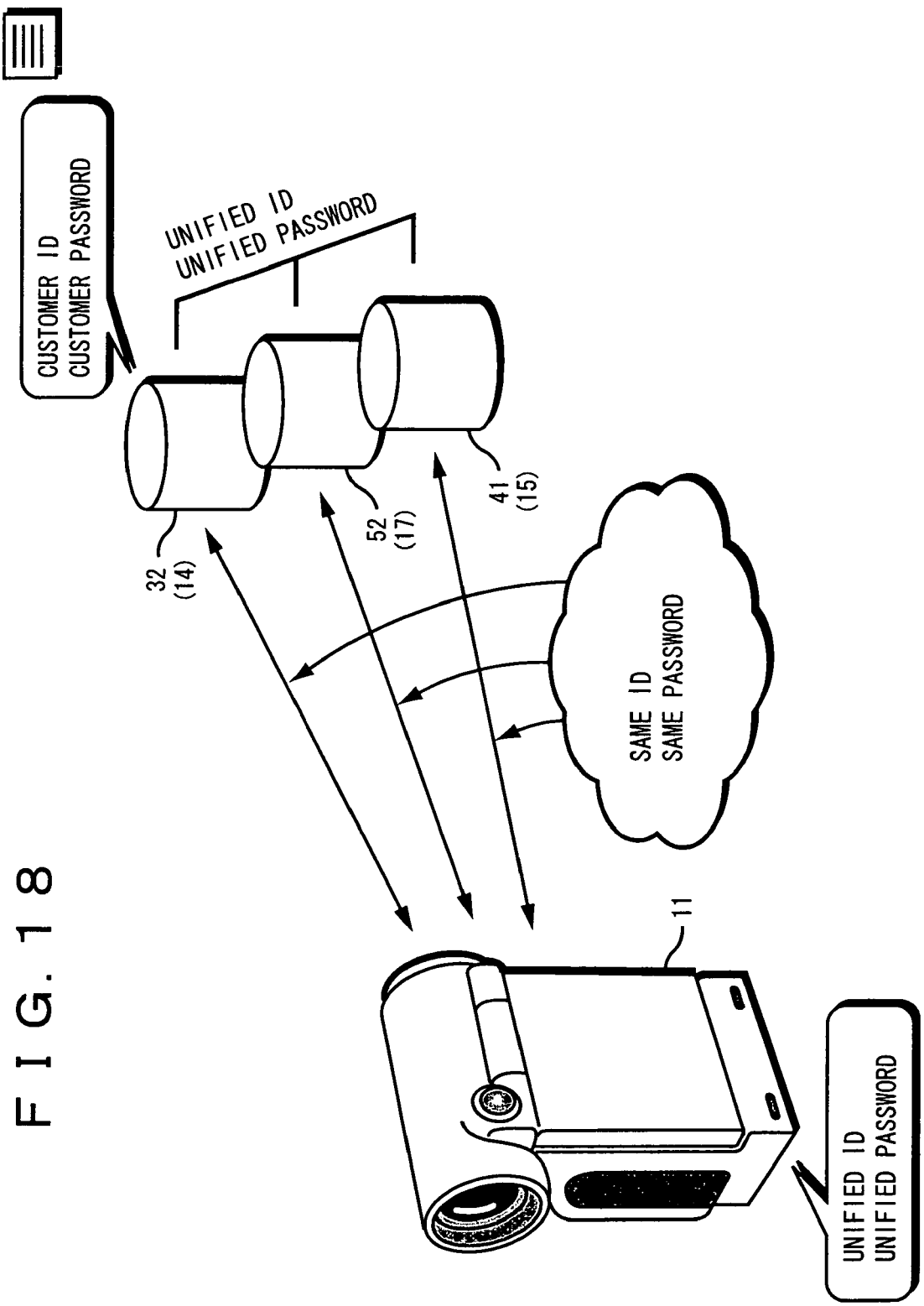
FIG. 18 is a view illustrating utilization of a common ID and password.

As described above, in the present service providing system, the temporary ID and the temporary password (same ID and password) issued upon user registration into the network system 14 can be used as an ID and a password for the network system 14, network service business center 15 and the Internet service provider A 17 to enjoy provision of the individual services as shown in FIG. 18.

While the series of processes described above can be executed by hardware, it may otherwise be executed by software. Where the series of processes is executed by software, a program which constructs the software is installed from a network or a recording medium into a computer incorporated in hardware for exclusive use or, for example, a personal computer for universal use which can execute various functions by installing various programs.

The recording medium is not only formed as a package medium such as, as shown in FIGS. 3 to 6, a magnetic disk 91 (including a floppy disk), 131, 171 or 211, an optical disk 92 (including a CD-ROM (Compact Disk-Read Only Memory) and a DVD (Digital Versatile Disk)), 132, 172 or 212, or a magneto-optical disk 93 (including an MD (Mini-Disk)), 133, 173 or 213, or a semiconductor memory 94, 134, 174 or 214 or the like which has the program recorded thereon or therein and is distributed in order to provide the program separately from an apparatus body, but also formed as a ROM 72, 112, 152 or 192 or a hard disk included in the storage section 118, 158 or 198 in which the program is stored therein and which is provided to a user in a state wherein it is incorporated in an apparatus body in advance.

It is to be noted that, in the present specification, the steps which describe the program stored in a recording medium may be but need not necessarily be processed in a time series in the order as described, and include processes which are executed in parallel or individually without being processed in a time series.

Further, in the present specification, the system represents an entire apparatus formed from a plurality of apparatus.

INDUSTRIAL APPLICABILITY

As described above, with the information processing system of the present invention, since the first access information necessitated to access the second information processing apparatus and the second access information necessitated to access the third information processing apparatus are common, an information processing system wherein the operability is improved can be implemented.

With the first information processing apparatus and method, recording medium and program of the present invention, since an ID corresponding to accepted personal information is issued and the ID is transmitted through the network, the ID can be utilized as a common ID to the other apparatus.

With the second information processing apparatus and method, recording medium and program of the present invention, since at least part of the received personal information is displayed for registration of the user and, after this is confirmed by the user, an ID is issued to the user and then a table wherein the issued ID is matched with an ID included in the personal information is produced, also when the user accesses utilizing the ID same as that for the second information processing apparatus, the access can be accepted.

With the third information processing apparatus and method, recording medium and program of the present invention, since confirmation of the user is obtained based on a mail address and the name and then an ID issued by a different information processing apparatus is registered as information for accepting accessing from the user, the ID common to that for the different information processing apparatus can be utilized to provide a service simply and with certainty.

With the fourth information processing apparatus and method, recording medium and program of the present invention, when the second different information processing apparatus is accessed through the network, an input of an ID received from the first different information processing apparatus is received and converted into an ID issued by the second information processing apparatus based on the prepared table and the converted ID is used for accessing. Consequently, the first information processing apparatus and the second information processing apparatus can be accessed based on the common ID.

The invention claimed is:

1. An information processing system including a plurality of information processing apparatus interconnected by a network, comprising:
   first access information utilized when a first one of said information processing apparatus accesses a second one of said information processing apparatus; and
   second access information utilized when the first information processing apparatus accesses a third one of said information processing apparatus,
   wherein the first access information and the second access information have a common identification,
   wherein the network includes a camcorder that directly accesses the network with a wireless connection,
   wherein the camcorder directly accesses the plurality of information processing apparatus in the network using the common identification,
   wherein the common identification is a result of a registration process of a user to one of the plurality information processing apparatus by using the recording apparatus and the access destination of one of the plurality of information processing apparatus is prestored in the recording apparatus,
   wherein the recording apparatus displays a message sent from one of the plurality of information processing apparatus, and
   wherein a temporary ID and a temporary password being valid for a predetermined period are issued upon registration of the user and a regular ID is provided to the user.

2. An information processing system according to claim 1, wherein the access information includes an ID and a password.

3. An information processing system according to claim 1, wherein
   the second information processing apparatus issues the access information when a user of the first information processing apparatus is registered into the second information processing apparatus, and
   the third information processing apparatus issues the access information when the user is registered into the third information processing apparatus in order to provide a predetermined service to the user of the first information processing apparatus.

4. An information processing system according to claim 3, wherein
   the access information is used further as third access information necessitated when a fourth one of said information processing apparatus provides a predetermined service to the user of the first information processing apparatus.

5. An information processing apparatus, comprising:
   acceptance means for accepting personal information of a user of a first information processing apparatus;
   storage means for storing the personal information accepted by said acceptance means;
   issuance means for issuing an ID corresponding to the personal information accepted by said acceptance means; and
   transmission means for transmitting the ID issued by said issuance means to a second information processing apparatus through a network,
   wherein the information apparatus, the first information processing apparatus, and the second information processing apparatus comprise at least one recording apparatus for recording one or more image signals and one or more audio signals,
   wherein the personal information is sent to the information processing apparatus during a registration process of a user to the information processing apparatus by using the recording apparatus and the access destination of the information processing apparatus is prestored in the recording apparatus,
   wherein the first information processing apparatus is a camcorder that directly accesses the network with a wireless connection,
   wherein the camcorder directly accesses the plurality of information processing apparatus in the network using the ID,
   wherein the recording apparatus displays a message sent from one of the plurality of information processing apparatus, and
   wherein a temporary ID and a temporary password being valid for a predetermined period are issued upon registration of the user and a regular ID is provided to the user.

6. An information processing method for processing information by an information processing apparatus, comprising:
   an acceptance step of accepting personal information of a user of a first information processing apparatus;
   a storage step of storing the personal information accepted by the process of the acceptance step;
   an issuance step of issuing an ID corresponding to the personal information accepted by the process of the acceptance step; and
   a transmission step of transmitting the ID issued by the process of the issuance step to a second information processing apparatus through a network,
   wherein the first information apparatus and the second information processing apparatus comprise at least one recording apparatus for recording one or more image signals and one or more audio signals,
   wherein the personal information is sent to the information processing apparatus during a registration process of a user to the information processing apparatus by using the recording apparatus and the access destination of the information processing apparatus is prestored in the recording apparatus,
   wherein the first information processing apparatus is a camcorder that directly accesses the network with a wireless connection,
   wherein the camcorder directly accesses the plurality of information processing apparatus in the network using the ID,
   wherein the recording apparatus displays a message sent from one of the plurality of information processing apparatus, and
   wherein a temporary ID and a temporary password being valid for a predetermined period are issued upon registration of the user and a regular ID is provided to the user.

7. A recording medium on which a computer-readable program is recorded, which when executed, causes a computer to execute a process, the process comprising:
- an acceptance step of accepting personal information of a user of a first information processing apparatus;
- a storage step of storing the personal information accepted by the process of the acceptance step;
- an issuance step of issuing an ID corresponding to the personal information accepted by the process of the acceptance step; and
- a transmission step of transmitting the ID issued by the process of the issuance step to a second information processing apparatus through a network,
- wherein the first information processing apparatus and the second information processing apparatus comprise at least one recording apparatus for recording one or more image signals and one or more audio signals,
- wherein the personal information is sent to the information processing apparatus during a registration process of a user to an information processing apparatus by using the recording apparatus and the access destination of the information processing apparatus is prestored in the recording apparatus,
- wherein the first information processing apparatus is a camcorder that directly accesses the network with a wireless connection,
- wherein the camcorder directly accesses the plurality of information processing apparatus in the network using the ID,
- wherein the recording apparatus displays a message sent from one of the plurality of information processing apparatus, and
- wherein a temporary ID and a temporary password being valid for a predetermined period are issued upon registration of the user and a regular ID is provided to the user.

8. A recording medium on which a computer-readable program is recorded, which when executed, causes a processor to execute a process, the process comprising:
- an acceptance step of accepting personal information of a user of a first information processing apparatus;
- a storage step of storing the personal information accepted by the process of the acceptance step;
- an issuance step of issuing an ID corresponding to the personal information accepted by the process of the acceptance step; and
- a transmission step of transmitting the ID issued by the process of the issuance step to a second information processing apparatus through a network,
- wherein the first information processing apparatus and the second information processing apparatus comprise at least one recording apparatus for recording one or more image signals and one or more audio signals,
- wherein the personal information is sent to the information processing apparatus during a registration process of a user to an information processing apparatuses by using the recording apparatus and the access destination of the information processing apparatus is prestored in the recording apparatus,
- wherein the first information processing apparatus is a camcorder that directly accesses the network with a wireless connection,
- wherein the camcorder directly accesses the plurality of information processing apparatus in the network using the ID,
- wherein the recording apparatus displays a message sent from one of the plurality of information processing apparatus, and
- wherein a temporary ID and a temporary password being valid for a predetermined period are issued upon registration of the user and a regular ID is provided to the user.

9. An information processing apparatus, comprising:
- reception means for receiving, from a second information processing apparatus in which personal information of a user of a first information processing apparatus is registered, the personal information through a network;
- control means for controlling said first information processing apparatus to display at least part of the personal information received by said reception means for registration of the user of said first information processing apparatus;
- confirmation means for acquiring confirmation of the user with regard to registration of the user based on at least part of the personal information displayed on said first information processing apparatus;
- registration means for registering the user based on the personal information received by said reception means in response to the confirmation by said confirmation means;
- issuance means for issuing an ID to the user; and
- production means for producing a table wherein the ID issued by said issuance means is matched with an ID and a password issued by said second information processing apparatus and included in the personal information received by said reception means,
- wherein the first information processing apparatus, and the second information processing apparatus comprise at least one recording apparatus for recording one or more image signals and one or more audio signals,
- wherein the personal information is sent to the information processing apparatus during a registration process of a user to the second information processing apparatus by using the recording apparatus and the access destination of the second information processing apparatus is prestored in the recording apparatus,
- wherein the first information processing apparatus is a camcorder that directly accesses the network with a wireless connection,
- wherein the camcorder directly accesses the plurality of information processing apparatus in the network using the ID,
- wherein the recording apparatus displays a message sent from one of the plurality of information processing apparatus, and
- wherein a temporary ID and a temporary password being valid for a predetermined period are issued upon registration of the user and a regular ID is provided to the user.

10. An information processing apparatus according to claim 9, comprising:
- requesting means for requesting, where an ID is issued already to the user of said first information processing apparatus, said first information processing apparatus to match the ID issued already and the ID by said second information processing apparatus with each other.

11. An information processing method, comprising:
- a reception step of receiving, from a second information processing apparatus in which personal information of a user of a first information processing apparatus is registered, the personal information through a network;
- a control step of controlling said first information processing apparatus to display at least part of the personal information received by the process of the reception step for registration of the user of said first information processing apparatus;

a confirmation step of acquiring confirmation of the user with regard to registration of the user based on at least part of the personal information displayed on said first information processing apparatus;

a registration step of registering the user based on the personal information received by the process of the reception step in response to the confirmation by the process of the confirmation step;

an issuance step of issuing an ID to the user; and a production step of producing a table wherein the ID issued by the process of the issuance step is matched with an ID and a password issued by said second information processing apparatus and included in the personal information received by the process of the reception step, wherein the first information processing apparatus and the second information processing apparatus comprise at least one recording apparatus for recording one or more image signals and one or more audio signals, wherein the personal information is sent to the information processing apparatus during a registration process of a user to the second information processing apparatus by using the recording apparatus and the access destination of the second information processing apparatus is pre-stored in the recording apparatus, wherein the first information processing apparatus is a camcorder that directly accesses the network with a wireless connection, wherein the camcorder directly accesses the plurality of information processing apparatus in the network using the ID, wherein the recording apparatus displays a message sent from one of the plurality of information processing apparatus, and wherein a temporary ID and a temporary password being valid for a predetermined period are issued upon registration of the user and a regular ID is provided to the user.

12. A recording medium on which a computer-readable program is recorded, which when executed, causes a computer to execute a process, the process comprising:

a reception step of receiving, from a second information processing apparatus in which personal information of a user of a first information processing apparatus is registered, the personal information through a network;

a control step of controlling said first information processing apparatus to display at least part of the personal information received by the process of the reception step for registration of the user of said first information processing apparatus;

a confirmation step of acquiring confirmation of the user with regard to registration of the user based on at least part of the personal information displayed on said first information processing apparatus;

a registration step of registering the user based on the personal information received by the process of the reception step in response to the confirmation by the process of the confirmation step;

an issuance step of issuing an ID to the user; and a production step of producing a table wherein the ID issued by the process of the issuance step is matched with an ID and a password issued by said second information processing apparatus and included in the personal information received by the process of the reception step, wherein the first information processing apparatus and the second information processing apparatus comprise at least one recording apparatus for recording one or more image signals and one or more audio signals, wherein the personal information is sent to the information processing apparatus during a registration process of a user to the second information processing apparatus by using the recording apparatus and the access destination of the second information processing apparatus is pre-stored in the recording apparatus, wherein the first information processing apparatus is a camcorder that directly accesses the network with a wireless connection, wherein the camcorder directly accesses the plurality of information processing apparatus in the network using the ID, wherein the recording apparatus displays a message sent from one of the plurality of information processing apparatus, and wherein a temporary ID and a temporary password being valid for a predetermined period are issued upon registration of the user and a regular ID is provided to the user.

13. A recording medium on which a computer-readable program is recorded, which when executed, causes a computer to execute a process, the process comprising:

a reception step of receiving, from a second information processing apparatus in which personal information of a user of a first information processing apparatus is registered, the personal information through a network;

a control step of controlling said first information processing apparatus to display at least part of the personal information received by the process of the reception step for registration of the user of said first information processing apparatus;

a confirmation step of acquiring confirmation of the user with regard to registration of the user based on at least part of the personal information displayed on said first information processing apparatus;

a registration step of registering the user based on the personal information received by the process of the reception step in response to the confirmation by the process of the confirmation step;

wherein the first information processing apparatus is a camcorder that directly accesses the network with a wireless connection, wherein the camcorder directly accesses the plurality of information processing apparatus in the network using the ID, an issuance step of issuing an ID to the user; and a production step of producing a table wherein the ID and a password issued by the process of the issuance step is matched with an ID issued by said second information processing apparatus and included in the personal information received by the process of the reception step, wherein the first information processing apparatus and the second information processing apparatus comprise at least one recording apparatus for recording one or more image signals and one or more audio signals, wherein the personal information is sent to the information processing apparatus during a registration process of a user to the second information processing apparatus by using the recording apparatus and the access destination of the second information processing apparatus is pre-stored in the recording apparatus, wherein the recording apparatus displays a message sent from one of the plurality of information processing apparatus, and wherein a temporary ID and a temporary password being valid for a predetermined period are issued upon registration of the user and a regular ID is provided to the user.

14. An information processing apparatus, comprising:
reception means for receiving, from a second information processing apparatus in which personal information of a user of a first information processing apparatus is registered, a mail address and a name as well as an ID and a password of the user through a network;
control means for controlling said first information processing apparatus to display the mail address and the name received by said reception means for registration of the user;
confirmation means for acquiring confirmation of the user with regard to registration of the user based on the mail address and the name displayed on said first information processing apparatus; and
registration means for registering the mail address and the name as well as the ID and the password as information for acceptance of accessing from the user in response to the confirmation by said confirmation means,
wherein the first information processing apparatus and the second information processing apparatus comprise at least one recording apparatus for recording one or more image signals and one or more audio signals,
wherein the personal information is sent to the information processing apparatus during a registration process of a user to the second information processing apparatus by using the recording apparatus and the access destination of the second information processing apparatus is prestored in the recording apparatus,
wherein the first information processing apparatus is a camcorder that directly accesses the network with a wireless connection,
wherein the camcorder directly accesses the plurality of information processing apparatus in the network using the ID and the password,
wherein the recording apparatus displays a message sent from one of the plurality of information processing apparatus, and
wherein a temporary ID and a temporary password being valid for a predetermined period are issued upon registration of the user and a regular ID is provided to the user.

15. An information processing method, comprising:
a reception step of receiving, from a second information processing apparatus in which personal information of a user of a first information processing apparatus is registered, a mail address and a name as well as an ID and a password of the user through a network;
a control step of controlling said first information processing apparatus to display the mail address and the name received by the process of the reception step for registration of the user;
a confirmation step of acquiring confirmation of the user with regard to registration of the user based on the mail address and the name displayed on said first information processing apparatus; and
a registration step of registering the mail address and the name as well as the ID and the password as information for acceptance of accessing from the user in response to the confirmation by the process of the confirmation step,
wherein the first different information processing apparatus and the second information processing apparatus comprise at least one recording apparatus for recording one or more image signals and one or more audio signals,
wherein the personal information is sent to the information processing apparatus during a registration process of a user to the second information processing apparatus by using the recording apparatus and the access destination of the second information processing apparatus is prestored in the recording apparatus,
wherein the first information processing apparatus is a camcorder that directly accesses the network with a wireless connection,
wherein the camcorder directly accesses the plurality of information processing apparatus in the network using the ID and the password,
wherein the recording apparatus displays a message sent from one of the plurality of information processing apparatus, and
wherein a temporary ID and a temporary password being valid for a predetermined period are issued upon registration of the user and a regular ID is provided to the user.

16. A recording medium on which a computer-readable program is recorded, which when executed, causes a computer to execute a process, the process comprising:
a reception step of receiving, from a second information processing apparatus in which personal information of a user of a first information processing apparatus is registered, a mail address and a name as well as an ID and a password of the user through a network;
a control step of controlling said first information processing apparatus to display the mail address and the name received by the process of the reception step for registration of the user;
a confirmation step of acquiring confirmation of the user with regard to registration of the user based on the mail address and the name displayed on said first information processing apparatus; and
a registration step of registering the mail address and the name as well as the ID and the password as information for acceptance of accessing from the user in response to the confirmation by the process of the confirmation step,
wherein the first information processing apparatus and the second information processing apparatus comprise at least one recording apparatus for recording one or more image signals and one or more audio signals,
wherein the personal information is sent to the information processing apparatus during a registration process of a user to the second information processing apparatus by using the recording apparatus and the access destination of the second information processing apparatus is prestored in the recording apparatus,
wherein the first information processing apparatus is a camcorder that directly accesses the network with a wireless connection,
wherein the camcorder directly accesses the plurality of information processing apparatus in the network using the ID and the password,
wherein the recording apparatus displays a message sent from one of the plurality of information processing apparatus, and
wherein a temporary ID and a temporary password being valid for a predetermined period are issued upon registration of the user and a regular ID is provided to the user.

17. A recording medium on which a computer-readable program is recorded, which when executed, causes a processor to execute a process, the process comprising:
a reception step of receiving, from a second information processing apparatus in which personal information of a user of a first information processing apparatus is registered, a mail address and a name as well as an ID and a password of the user through a network;

a control step of controlling said first information processing apparatus to display the mail address and the name received by the process of the reception step for registration of the user;

a confirmation step of acquiring confirmation of the user with regard to registration of the user based on the mail address and the name displayed on said first information processing apparatus; and a registration step of registering the mail address and the name as well as the ID and the password as information for acceptance of accessing from the user in response to the confirmation by the process of the confirmation step, wherein the first information processing apparatus and the second information processing apparatus comprise at least one recording apparatus for recording one or more image signals and one or more audio signals, wherein the personal information is sent to the information processing apparatus during a registration process of a user to the second information processing apparatus by using the recording apparatus and the access destination of the second information processing apparatus is prestored in the recording apparatus, wherein the first information processing apparatus is a camcorder that directly accesses the network with a wireless connection, wherein the camcorder directly accesses the plurality of information processing apparatus in the network using the ID and the password, wherein the recording apparatus displays a message sent from one of the plurality of information processing apparatus, and wherein a temporary ID and a temporary password being valid for a predetermined period are issued upon registration of the user and a regular ID is provided to the user.

18. An information processing apparatus, comprising:

reception means for receiving an ID through a network from a first information processing apparatus in which personal information of a user is registered;

production means for producing a table wherein an ID issued already by a second information processing apparatus is matched with the ID received by said reception means;

first accessing means for accessing said first information processing apparatus through said network based on the ID received from said first information processing apparatus; and second accessing means for converting, in order to access said second information processing apparatus through said network, the ID received from said first information processing apparatus into the ID issued from said second information processing apparatus based on the table produced by said production means and accessing said second information processing apparatus with the ID obtained by the conversion, wherein the first information processing apparatus and the second information processing apparatus comprise at least one recording apparatus for recording one or more image signals and one or more audio signals, wherein the ID is a result of a registration process of the user to the first information processing apparatus by using the recording apparatus and the access destination of the first information processing apparatus is prestored in the recording apparatus, wherein the first information processing apparatus is a camcorder that directly accesses the network with a wireless connection, wherein the camcorder directly accesses the plurality of information processing apparatus in the network using the ID, wherein the recording apparatus displays a message sent from one of the plurality of information processing apparatus, and wherein a temporary ID and a temporary password being valid for a predetermined period are issued upon registration of the user and a regular ID is provided to the user.

19. An information processing method, comprising:

a reception step of receiving an ID through a network from a first information processing apparatus in which personal information of a user is registered;

a production step of producing a table wherein an ID issued already by a second information processing apparatus is matched with the ID received by the process of the reception step;

a first accessing step of accessing said first information processing apparatus through said network based on the ID received from said first information processing apparatus; and a second accessing step of converting, in order to access said second information processing apparatus through said network, the ID received from said first information processing apparatus into the ID issued from said second information processing apparatus based on the table produced by the step of the production step and accessing said second different information processing apparatus with the ID obtained by the conversion, wherein the first information processing apparatus and the second information processing apparatus comprise at least one recording apparatus for recording one or more image signals and one or more audio signals, wherein the ID is a result of a registration process of the user to the first information processing apparatus by using the recording apparatus and the access destination of the first information processing apparatus is prestored in the recording apparatus, wherein the first information processing apparatus is a camcorder that directly accesses the network with a wireless connection, wherein the camcorder directly accesses the plurality of information processing apparatus in the network using the ID, wherein the recording apparatus displays a message sent from one of the plurality of information processing apparatus, and wherein a temporary ID and a temporary password being valid for a predetermined period are issued upon registration of the user and a regular ID is provided to the user.

20. A recording medium on which a computer-readable program is recorded, which when executed, causes a computer to execute a process, the process comprising:

a reception step of receiving an ID through a network from a first information processing apparatus in which personal information of a user is registered;

a production step of producing a table wherein an ID issued already by a second information processing apparatus is matched with the ID received by the process of the reception step;

a first accessing step of accessing said first information processing apparatus through said network based on the ID received from said first information processing apparatus; and a second accessing step of converting, in order to access said second information processing apparatus through said network, the ID received from said first information processing apparatus into the ID issued from said second information processing apparatus based on the table produced by the step of the production step and accessing said second different information processing apparatus with the ID obtained by the conversion, wherein the first information processing apparatus and the second information processing apparatus comprise at least one recording apparatus for recording one or more image signals and one or more audio signals, wherein the ID is a result of a registration process of the user to the first information processing apparatus by using the recording apparatus and the access destination of the first information processing apparatus is prestored in the recording apparatus, wherein the first information processing apparatus is a camcorder that directly accesses the network with a wireless connection, wherein the camcorder directly accesses the plurality of information processing apparatus in the network using the ID, wherein the recording apparatus displays a message sent from one of the plurality of information processing apparatus, and wherein a temporary ID and a temporary password being valid for a predetermined period are issued upon registration of the user and a regular ID is provided to the user.

21. A recording medium on which a computer-readable program is recorded, which when executed, causes a computer to execute a process, the process comprising:

a reception step of receiving an ID through a network from a first information processing apparatus in which personal information of a user is registered;

a production step of producing a table wherein an ID issued already by a second information processing apparatus is matched with the ID received by the process of the reception step;

a first accessing step of accessing said first information processing apparatus through said network based on the ID received from said first information processing apparatus; and a second accessing step of converting, in order to access said second information processing apparatus through said network, the ID received from said first information processing apparatus into the ID issued from said second information processing apparatus based on the table produced by the step of the production step and accessing said second information processing apparatus with the ID obtained by the conversion, wherein the first information processing apparatus and the second information processing apparatus comprise at least one recording apparatus for recording one or more image signals and one or more audio signals, wherein the ID is a result of a registration process of the user to the first information processing apparatus by using the recording apparatus and the access destination of the first information processing apparatus is prestored in the recording apparatus, wherein the first information processing apparatus is a camcorder that directly accesses the network with a wireless connection, wherein the camcorder directly accesses the plurality of information processing apparatus in the network using the ID, wherein the recording apparatus displays a message sent from one of the plurality of information processing apparatus, and wherein a temporary ID and a temporary password being valid for a predetermined period are issued upon registration of the user and a regular ID is provided to the user.

* * * * *